United States Patent
Li

(10) Patent No.: US 11,392,267 B2
(45) Date of Patent: Jul. 19, 2022

(54) ICON DISPLAY CONTROL METHOD AND TERMINAL

(71) Applicant: VIVO MOBILE COMMUNICATION CO., LTD., Guangdong (CN)

(72) Inventor: Ke Li, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/039,666

(22) Filed: Sep. 30, 2020

(65) Prior Publication Data

US 2021/0019038 A1    Jan. 21, 2021

Related U.S. Application Data

(63) Continuation of application No. PCT/CN2019/079647, filed on Mar. 26, 2019.

(30) Foreign Application Priority Data

Mar. 30, 2018  (CN) .......................... 201810297693.3

(51) Int. Cl.
*G06F 3/04817* (2022.01)
*G06F 3/0482* (2013.01)
*G06F 3/0486* (2013.01)

(52) U.S. Cl.
CPC ........ *G06F 3/04817* (2013.01); *G06F 3/0482* (2013.01); *G06F 3/0486* (2013.01)

(58) Field of Classification Search
CPC ... G06F 3/04817; G06F 3/0486; G06F 3/0482
See application file for complete search history.

(56) References Cited

U.S. PATENT DOCUMENTS

| 2008/0320391 | A1* | 12/2008 | Lemay | ................ G06F 3/04886 715/702 |
| 2009/0058821 | A1* | 3/2009 | Chaudhri | .............. G06F 3/0482 345/173 |
| 2012/0084682 | A1* | 4/2012 | Sirpal | ...................... G06F 1/16 715/761 |
| 2013/0100475 | A1 | 4/2013 | Kuroyanagi | |

(Continued)

FOREIGN PATENT DOCUMENTS

| CN | 103699319 A * | 4/2014 | .......... G06F 3/0486 |
| CN | 103699319 A | 4/2014 | |

(Continued)

OTHER PUBLICATIONS

European Search Report dated Apr. 8, 2021 as received in application No. 19775120.9.

(Continued)

*Primary Examiner* — Mong-Shune Chung
(74) *Attorney, Agent, or Firm* — Maschoff Brennan

(57) ABSTRACT

An icon display control method and a terminal are disclosed. The method includes: displaying, by the terminal, a first icon and a second icon in a first icon display area and a second icon display area, respectively; receiving, by the terminal, a first input by a user; in response to the first input, displaying, by the terminal, the first icon in an icon control box corresponding to the second icon display area; and updating, by the terminal, display content of the second icon display area to the first icon.

20 Claims, 17 Drawing Sheets

(56) References Cited

U.S. PATENT DOCUMENTS

| | | | | |
|---|---|---|---|---|
| 2016/0154572 A1* | 6/2016 | Ogawa | ................ | G06F 3/04817 715/763 |
| 2017/0277380 A1* | 9/2017 | Shan | ................... | G06F 3/04817 |
| 2017/0336944 A1* | 11/2017 | Liu | ..................... | G06F 3/04842 |
| 2021/0019038 A1 | 1/2021 | Li | | |

FOREIGN PATENT DOCUMENTS

| | | | |
|---|---|---|---|
| CN | 103777886 | A | 5/2014 |
| CN | 104238877 | A | 12/2014 |
| CN | 105094527 | A | 11/2015 |
| CN | 105446598 | A | 3/2016 |
| CN | 106155472 | A | 11/2016 |
| CN | 106354359 | A | 1/2017 |
| CN | 106406679 | A | 2/2017 |
| CN | 107566638 | A | 1/2018 |
| CN | 108595070 | A | 9/2018 |
| EP | 3173918 | A1 | 5/2017 |
| JP | 2012058979 | A | 3/2012 |
| JP | 2017107395 | A | 6/2017 |

OTHER PUBLICATIONS

CN Office Action in Application No. 201810297693.3 dated Dec. 6, 2019.
CN Search Report in Application No. 201810297693.3 dated Oct. 8, 2019.
International Search Report and Written Opinion in Application No. PCT/CN2019/079647 dated Jun. 19, 2019.

\* cited by examiner (5c)

(6c)

(7c)

ICON DISPLAY CONTROL METHOD AND TERMINAL

CROSS-REFERENCE TO RELATED APPLICATIONS

This application is a continuation application of International Application No. PCT/CN2019/079647 filed on Mar. 26, 2019, which claims priority to Chinese Patent Application No. 201810297693.3 filed in China on Mar. 30, 2018, both disclosures of which are incorporated herein by reference in their entireties.

TECHNICAL FIELD

Embodiments of this disclosure relate to the field of communications technologies, and in particular, to an icon display control method and a terminal.

BACKGROUND

With development of communications technologies, terminals such as mobile phones and tablet computers become increasingly intelligent to meet various needs of users. The users impose some requirements for flexibility of icon arrangement on the desktop of the terminal. For example, the users may need to exchange positions of two or more icons on the desktop.

In the prior art, when using the terminal, the user may separately move icons on a current screen of the desktop, so that the icons on the current screen are arranged based on user requirements. For example, when the user needs to exchange an icon A and an icon B that are displayed on the current screen, if there is a blank area on the current screen, the user may control the terminal to move the icon A to the blank area, so that an original position of the icon A is vacant. Then, the user controls the terminal to move the icon B from an original position of the icon B to the original position of the icon A, and finally moves the icon A from the blank area to the original position of the icon B.

A problem lies in that, in the process of controlling the terminal by the user to exchange the icon A and the icon B displayed on the current screen, when the terminal moves the icon A to the original position of the icon B, the icon B may be moved to a position (such as the blank area) other than the original position of the icon B and the original position of the icon B before being moved to the original position of the icon A. As a result, an operation in a process of controlling an icon by the terminal to move and display is complicated and time-consuming.

SUMMARY

Embodiments of this disclosure provide an icon display control method and a terminal, so as to resolve a problem that an operation in a process of controlling an icon by the terminal to move and display is complicated and time-consuming.

According to a first aspect, an embodiment of this disclosure provides an icon display control method. The method includes: displaying a first icon and a second icon in a first icon display area and a second icon display area, respectively; receiving a first input by a user; in response to the first input, displaying the first icon in an icon control box corresponding to the second icon display area; and updating display content of the second icon display area to the first icon.

According to a second aspect, an embodiment of this disclosure provides a terminal. The terminal includes a display module and a receiving module. The display module is configured to display a first icon and a second icon in a first icon display area and a second icon display area, respectively. The receiving module is configured to receive a first input by a user. The display module is further configured to: in response to the first input received by the receiving module, display the first icon in an icon control box corresponding to the second icon display area, and update display content of the second icon display area to the first icon.

According to a third aspect, an embodiment of this disclosure provides a terminal, including a processor, a memory, and a computer program stored in the memory and capable of running on the processor. The computer program is executed by the processor to implement steps of the icon display control method according to the first aspect.

According to a fourth aspect, an embodiment of this disclosure provides a computer readable storage medium storing a computer program. The computer program is executed by a processor to implement steps of the icon display control method according to the first aspect.

In the embodiments of this disclosure, in a scenario in which the terminal controls an icon to move and display, when the terminal displays an icon on a current screen, the terminal may also display an icon display area in which the icon is located and an icon control box corresponding to the icon display area. Therefore, when the terminal controls icons to move, an icon may be moved from one icon display area to an icon control box corresponding to another icon display area, so as to change the icon display area in which the icon is located, that is, change a position of the icon. An icon does not need to be moved to a blank area before being moved to another icon display area. In this way, the problem that the process of controlling an icon by the terminal to display is complicated and time-consuming can be resolved. In addition, both a position and an order of an unmoved icon do not change in the process of controlling an icon by the terminal to move and display.

BRIEF DESCRIPTION OF DRAWINGS

FIG. 3-1 is a schematic diagram 2 of a screen displayed on a terminal according to an embodiment of this disclosure;

FIG. 3-2 is a schematic diagram 3 of a screen displayed on a terminal according to an embodiment of this disclosure;

FIG. 3-3 is a schematic diagram 4 of a screen displayed on a terminal according to an embodiment of this disclosure;

DESCRIPTION OF EMBODIMENTS

The following clearly and describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

It should be noted that "I" in this specification represents or, for example, A/B may represent A or B; and that the term "and/or" in this specification describes only an association relationship for describing associated objects and represents that three relationships may exist, for example, A and/or B may represent the following three cases: Only A exists, both A and B exist, and only B exists. "Plurality" means two or more.

It should be noted that, in the embodiments of this disclosure, terms such as "exemplary" or "for example" are used to represent an example, an instance, or an illustration. Any embodiment or design scheme described as "exemplary" or "for example" in the embodiments of this disclosure should not be construed as being more preferred or advantageous than other embodiments or design schemes. To be precise, the use of terms such as "exemplary" or "for example" is intended to present a related concept in a specific manner.

A terminal in the embodiments of this disclosure may be a terminal with an operating system. The operating system may be an Android (Android) operating system, may be an ios operating system, or may be another possible operating system, which is not specifically limited in the embodiments of this disclosure.

The following uses the Android operating system as an example to introduce a software environment to which an icon display control method provided in the embodiments of this disclosure is applied.

Figure 1:
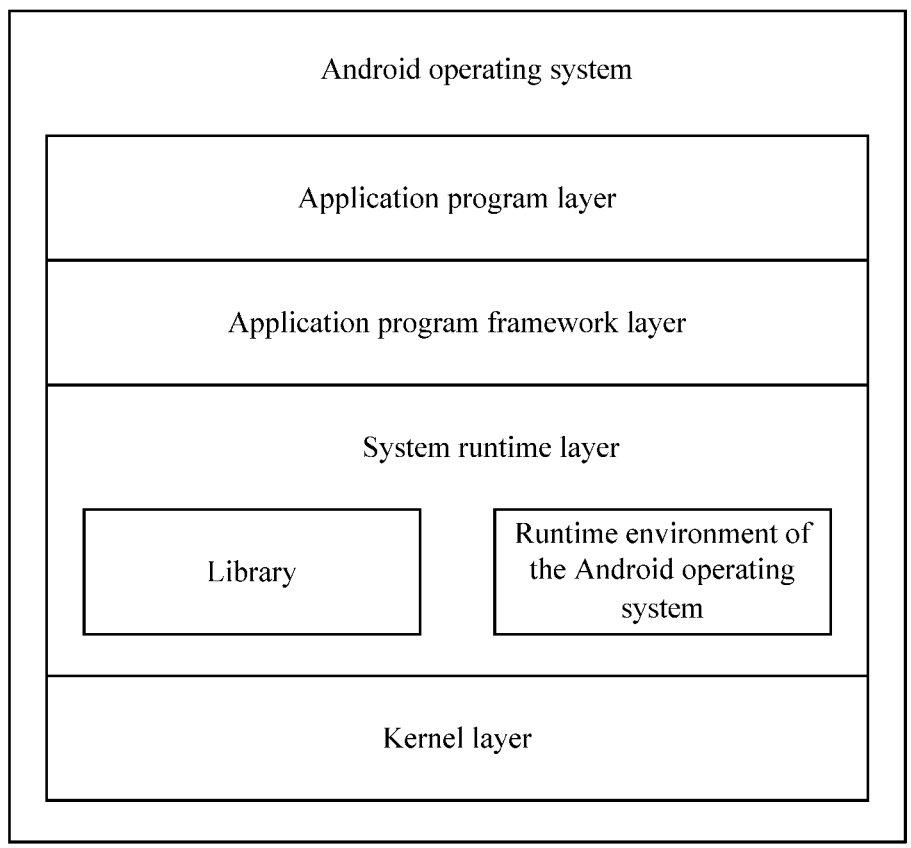
FIG. 1 is a schematic architectural diagram of an Android operating system according to an embodiment of this disclosure.

FIG. 1 is a schematic architectural diagram of a possible Android operating system according to an embodiment of this disclosure. In FIG. 1, an architecture of the Android operating system consists of four layers: an application program layer, an application program framework layer, a system runtime layer, and a kernel layer (which may be specifically a Linux kernel layer).

The application program layer includes various application programs (including system application programs and third-party application programs) in the Android operating system, for example, application programs such as a system setup application, a system chat application, and a system camera application; or application programs such as a third-party setup application, a third-party camera application, and a third-party chat application.

The application program framework layer is a framework of application programs, and developers may develop some application programs based on the application program framework layer in compliance with development principles of the framework of application programs.

The system runtime layer includes a library (also called a system library) and a runtime environment of the Android operating system. The library mainly provides various resources required by the Android operating system. The runtime environment of the Android operating system is used to provide a software environment for the Android operating system.

The kernel layer is an operating system layer of the Android operating system, and is a bottom layer in software layers of the Android operating system. The kernel layer provides core system services and hardware-related drivers for the Android operating system based on the Linux kernel.

Using the Android operating system as an example, in the embodiments of this disclosure, the developers may develop, based on the system architecture of the Android operating system shown in FIG. 1, a software program for implementing the icon display control method provided in the embodiments of this disclosure, so that the icon display control method can be executed based on the Android operating system shown in FIG. 1. In other words, a processor or a terminal device may implement the icon display control method provided in the embodiments of this disclosure by running the software program in the Android operating system.

Figure 2:
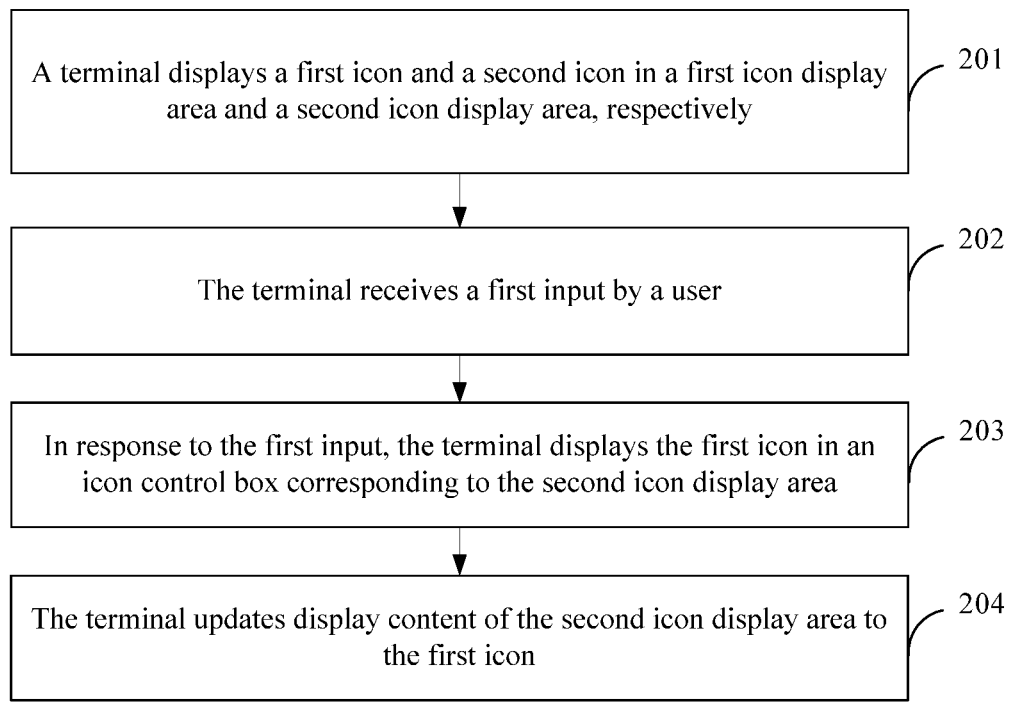
FIG. 2 is a schematic flowchart of an icon display control method according to an embodiment of this disclosure.

With reference to a flowchart of an icon display control method shown in FIG. 2, the following describes in detail the icon display control method provided in the embodiments of this disclosure. Although a logical sequence of the icon display control method provided in the embodiments of this disclosure is shown in the method flowchart, the illustrated or described steps may be performed in a different order in some cases. For example, the icon display control method shown in FIG. 2 may include step 201 to step 204.

Step 201. A terminal displays a first icon and a second icon in a first icon display area and a second icon display area, respectively.

It should be noted that the icon display control method provided in this embodiment of this disclosure may be executed by the terminal when icons on a desktop of the terminal or icons in some application programs are in an editable (for example, movable) state.

Specifically, each icon on a current screen displayed on the terminal can be moved. One icon may be displayed in one icon display area, one icon display area is corresponding to one icon control box, and one icon control box may be used to place an icon to be displayed in the icon display area.

It can be understood that one icon on the current screen of the terminal is displayed in one icon display area, and the terminal may move the icon from the icon display area to another icon display area or an icon control box corresponding to the another icon display area.

In addition, when the terminal displays the icon display area and the icon control box corresponding to the icon display area on the current screen, one or more to-be-filled areas may also be displayed. A to-be-filled area includes neither icons nor icon control boxes, and a to-be-filled area may be used to display a new icon other than the icons in the icon display areas.

Optionally, a setup application of the terminal provided in this embodiment of this disclosure may provide an option for setting an "icon editing mode" that is used to trigger the terminal to display, on the current screen, an icon display area in which each icon is located, an icon control box corresponding to the icon display area, and a to-be-filled area. Alternatively, a user may perform a specific input (such as a touch-and-hold input) on the desktop of the terminal to trigger the terminal to enter an "icon editing mode", that is, the terminal displays the icon display area in which each icon is located, the icon control box corresponding to the icon display area, and the to-be-filled area.

Optionally, an icon control box corresponding to an icon display area displayed on the current screen of the terminal is located near the icon display area. For example, an icon control box corresponding to an icon display area is located in the upper left corner, the lower left corner, the upper right corner, the lower right corner, or the like of the icon display area. In this embodiment of this disclosure, the following describes the icon display control method provided in this embodiment of this disclosure by using an example in which an icon control box corresponding to an icon display area is located in the upper left corner of the icon display area.

Figure 3A:
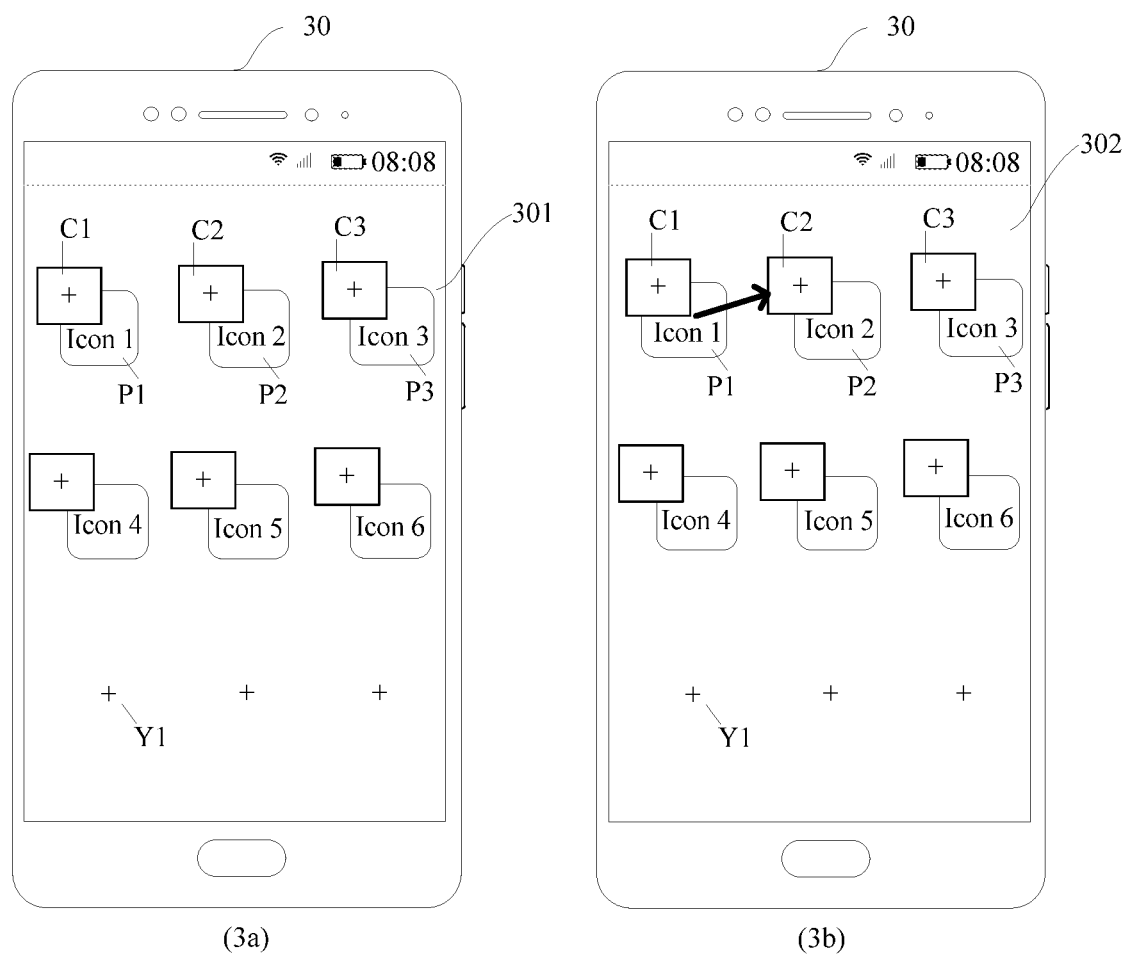
FIG. 3A and FIG. 3B are a schematic diagram 1 of a screen displayed on a terminal according to an embodiment of this disclosure.
Figure 3B:
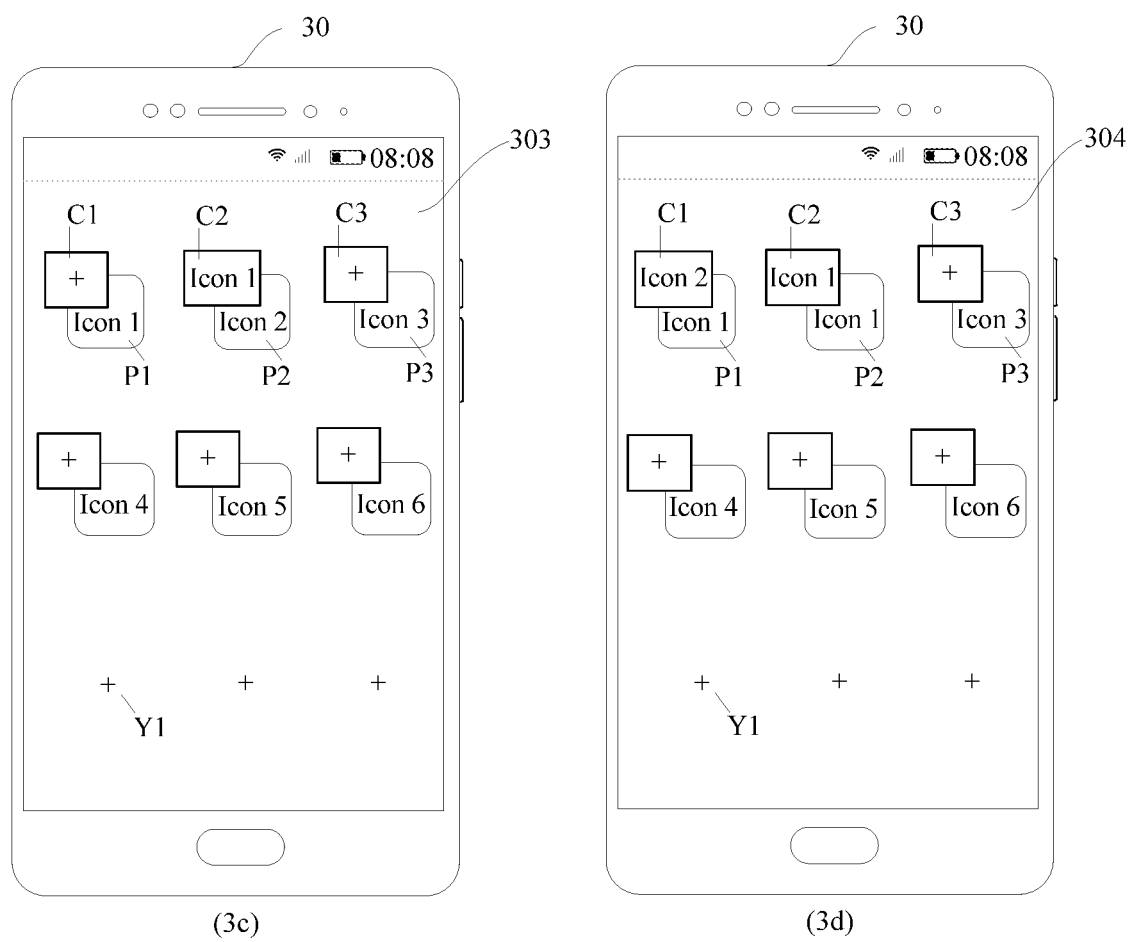

For example, FIG. 3A and FIG. 3B are a schematic diagram of a screen displayed on a terminal according to an embodiment of this disclosure. As shown in (3a) of FIG. 3A, a screen 301 of a terminal 30 includes six icons, namely icons 1 to 6. Each icon is displayed in one icon display area, and each icon display area is corresponding to one icon control box. Specifically, an icon 1 is displayed in an icon display area P1 on the screen 301, and the icon display area P1 is corresponding to an icon control box C1. An icon 2 is displayed in an icon display area P2 in the screen 301, and the icon display area P2 is corresponding to an icon control box C2. An icon 3 is displayed in an icon display area P3 on the screen 301, and the icon display area P3 is corresponding to an icon control box C3. In addition, the screen 301 shown in (3a) of FIG. 3A further includes three to-be-filled areas, such as a to-be-filled area Y1.

Specifically, the first icon provided in this embodiment of this disclosure may be the icon 1 shown on the screen 301, and the second icon may be the icon 2. The first icon display area is the icon display area P1 shown on the screen 301, and the second icon display area is the icon display area P2 shown on the screen 301.

Step 202. The terminal receives a first input by the user.

The first input may be an input that the user controls the terminal to move the first icon (for example, the icon 1).

For example, with reference to the screen 301 of the terminal 30 shown in (3a) of FIG. 3A, in an application scenario provided in this embodiment of this disclosure, the first input by the user may be used to control the terminal to move the first icon from the first icon display area to an icon control box corresponding to the second icon display area. To be specific, the terminal 30 controls the icon 1 on the screen 301 to move from the icon display area P1 to the icon control box C2.

Optionally, the terminal provided in this embodiment of this disclosure may have a touchscreen and a fingerprint sensor. The first input may be a touchscreen input or a fingerprint input. The touchscreen input may be a touch operation such as a press operation, a touch-and-hold operation, a slide operation, a tap operation, a float operation (an operation performed by the user near the touchscreen) of the terminal. The fingerprint input may be a fingerprint operation performed by the user on the fingerprint sensor of the terminal, such as a slide fingerprint, a touch-and-hold fingerprint, a tap fingerprint, or a double-tap fingerprint. Specifically, a manner of the first input is not limited in this embodiment of this disclosure, and may be any implementable manner.

Step 203. In response to the first input, the terminal displays the first icon in the icon control box corresponding to the second icon display area.

The first icon display area is an icon display area in which the first icon is located before the terminal moves the first icon.

It can be understood that before an icon in an icon area provided in this embodiment of this disclosure is moved, the icon includes some pixels. After the terminal controls the icon to move to an icon control box, the pixels of the icon may vary with a size of the icon control box. For example, after the terminal controls the icon to move to an icon control box, the pixels of the icon are reduced.

As shown in FIG. 3A and FIG. 3B, after the terminal 30 controls the icon 1 on a screen 302 shown in (3b) of FIG. 3A to move from the icon display area P1 to the icon control box C2, the terminal 30 may display a screen 303 shown in (3c) of FIG. 3B, and the icon 1 is displayed in the icon control box C2 on the screen 303.

Step 204. The terminal updates display content of the second icon display area to the first icon.

The second icon display area is an icon display area in which the second icon is located before the terminal moves the second icon.

For example, after the icon 1 displayed on the screen 303 shown in (3c) of FIG. 3B is displayed in the icon control box C2, the terminal 30 may display a screen 304 shown in (3d) of FIG. 3B. The icon 1 is displayed in the icon display area P2 shown on the screen 304, and the icon 2 is displayed in the icon control box C1.

It should be noted that in the icon display control method provided in this embodiment of this disclosure, in a scenario in which the terminal controls an icon to move and display, when the terminal displays an icon on a current screen, the terminal may also display an icon display area in which the icon is located and an icon control box corresponding to the icon display area. Therefore, when the terminal controls icons to move, an icon may be moved from one icon display area to an icon control box corresponding to another icon display area, so as to change the icon display area in which the icon is located, that is, change a position of the icon. An icon does not need to be moved to a blank area before being moved to another icon display area. In this way, a problem that a process of controlling an icon by the terminal to display is complicated and time-consuming can be resolved. In addition, both a position and an order of an unmoved icon do not change in the process of controlling an icon by the terminal to move and display.

In a possible implementation, in the icon display control method provided in this embodiment of this disclosure, after the terminal moves the first icon, positions of the first icon and the second icon can be exchanged. Specifically, the foregoing step 204 may be replaced with step 204a.

Step 204a. The terminal updates the display content of the second icon display area to the first icon, and updates display content of the first icon display area to the second icon.

Figures 1, 3:
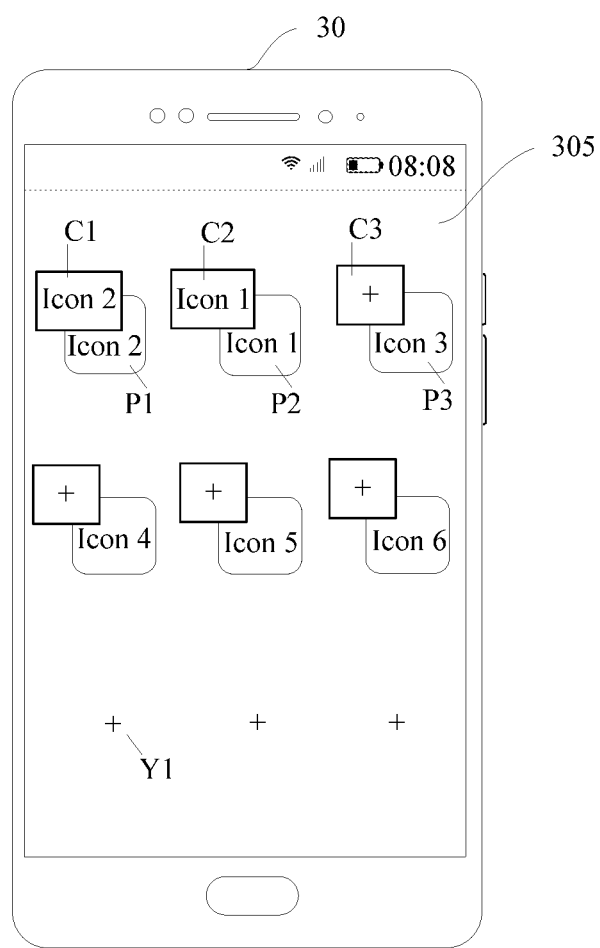
Figures 2, 3:
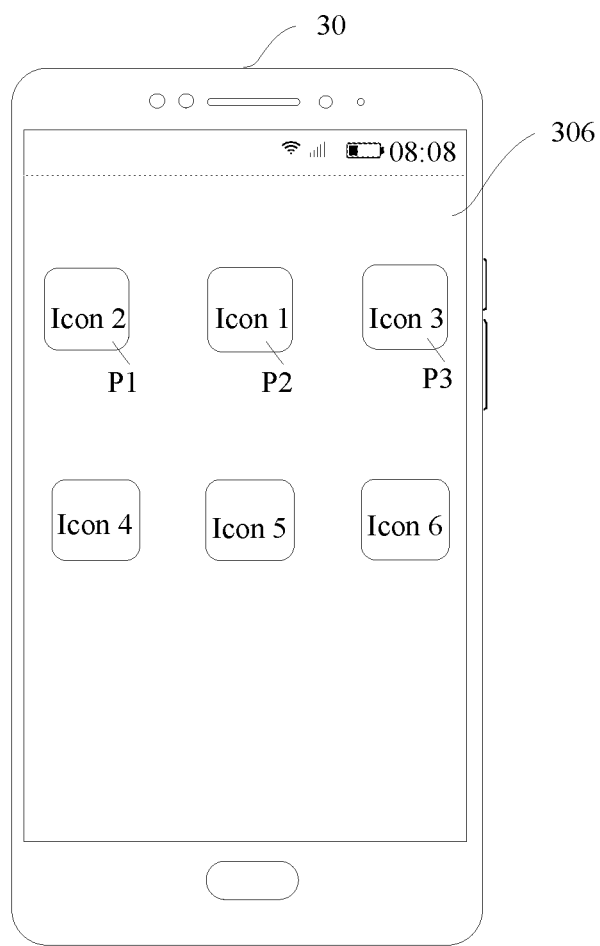
Figure 3:
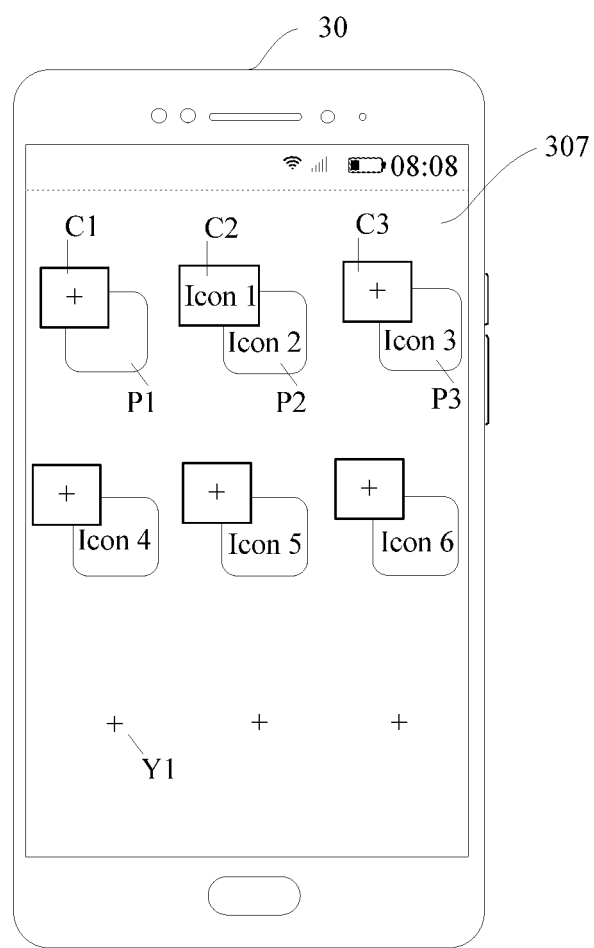

For example, FIG. 3-1 is a schematic diagram of another screen displayed on a terminal according to an embodiment of this disclosure.

With reference to FIG. 3A and FIG. 3B, after the terminal 30 displays a screen 304 shown in (3d) of FIG. 3B, a screen 305 of the terminal 30 shown in FIG. 3-1 may be displayed. On the screen 305, the icon 1 is displayed in the icon display area P2 and the icon 2 is displayed in the icon display area P1. In other words, the terminal 30 updates the display contents in the icon display area P1 and the icon display area P2.

Optionally, with reference to FIG. 3A and FIG. 3B, after the terminal 30 displays the screen 303 shown in (3c) of FIG. 3B, the screen 305 of the terminal 30 shown in FIG. 3-1 may be displayed. In this case, the terminal does not display the screen 304 shown in (3*d*) of FIG. 3B.

It should be noted that in the icon display control method provided in this embodiment of this disclosure, the terminal moves one icon from one icon display area to an icon control box corresponding to another icon display area, so as to exchange positions of two icons. In this way, an operation in the process of controlling an icon by the terminal to display can be simplified.

In a possible implementation, in the icon display control method provided in this embodiment of this disclosure, after moving the icon in an "icon editing mode", the terminal may exit the "icon editing mode" to display the moved icon. Specifically, after step 204 or step 204*a*, step 204*b* may be further included.

Step 204*b*. The terminal cancels the display of the first icon in the icon control box corresponding to the second icon display area.

The terminal may cancel the display of the icon in the icon control box corresponding to the icon display area on the current screen. Specifically, the terminal may remove icon control boxes corresponding to icon display areas displayed on the current screen.

For example, FIG. 3-2 is a schematic diagram of another screen displayed on a terminal according to an embodiment of this disclosure.

With reference to FIG. 3A and FIG. 3B, after the terminal 30 displays the screen 303 shown in (3*c*) of FIG. 3B, a screen 306 of the terminal 30 shown in FIG. 3-2 may be displayed. In this case, the terminal 30 does not display the screen 304 shown in (3*d*) of FIG. 3B.

Alternatively, after the terminal 30 displays the screen 304 shown in (3*d*) of FIG. 3B, the screen 306 of the terminal 30 shown in FIG. 3-2 may be displayed.

The screen 306 of the terminal 30 does not display the icon control boxes corresponding to the icon display areas. That is, the screen 306 does not display the icon control box corresponding to the second icon display area and the first icon in the icon control box. Certainly, the screen 306 neither displays one or more to-be-filled areas.

Optionally, with reference to FIG. 3-1, after the terminal 30 displays the screen 305 shown in FIG. 3-1, the screen 306 of the terminal 30 shown in FIG. 3-2 may be displayed.

It can be understood that, after the terminal moves the icon in the "icon editing mode" and a preset period of time elapses, the terminal may exit the "icon editing mode" and display the moved icon.

Optionally, during icon moving of the terminal in the "icon editing mode", for one icon, the icon is displayed only in one position on the current screen. That is, one icon is displayed in one icon display area, or the icon is displayed in one icon control box.

In the following embodiment, the icon display control method provided in this embodiment of this disclosure is described by using an example in which only one icon is displayed in one position during icon moving of the terminal.

FIG. 3-3 is a schematic diagram of another screen displayed on a terminal according to an embodiment of this disclosure.

With reference to FIG. 3A and FIG. 3B and FIG. 3-2, after displaying the screen 302 shown in (3*b*) of FIG. 3A, the terminal 30 may display a screen 307 of the terminal 30 shown in FIG. 3-3, but not display the screen 303 shown in (3*c*) of FIG. 3B or the screen 304 shown in (3*d*) of FIG. 3B. In addition, after the terminal 30 displays the screen 307 shown in FIG. 3-3, the screen 306 of the terminal 30 shown in FIG. 3-2 may be displayed. In this case, the terminal 30 does not display the screen 303 shown in (3*c*) of FIG. 3B, the screen 304 shown in (3*d*) of FIG. 3B, or the screen 305 shown in FIG. 3-1.

It should be noted that in the icon display control method provided in this embodiment of this disclosure, after moving the icon, the terminal may neither display the icon control boxes corresponding to the icon display areas nor display one or more to-be-filled areas. This prevents the icon control boxes corresponding to the icon display areas and one or more to-be-filled areas from occupying the display screen of the terminal when the terminal does not need to move icons.

In a possible implementation, in the icon display control method provided in this embodiment of this disclosure, an input that the user controls the terminal to move an icon may be in a plurality of manners. For example, step 202 in the foregoing embodiment may be replaced with step 202*a*, or step 202 may be replaced with step 202*b*.

Step 202*a*. The terminal receives the first input that the user drags the first icon from the first icon display area to the icon control box corresponding to the second icon display area.

For example, the user may drag the icon 1 from the icon display area P1 on the screen 302 shown in (3*b*) of FIG. 3A to the icon control box C2 to implement position exchange between the icon 1 and the icon 2, so that the terminal 30 to display the screen 303 shown in (3*c*) of FIG. 3B.

Specifically, the user may drag the icon 1 from a position 1 on the screen 302 shown in (3*b*) of FIG. 3A to a center position of the icon control box C2.

Step 202*b*. The terminal receives the first input that the user drags the icon control box corresponding to the second icon display area to the first icon display area.

For example, the user may drag the icon control box C2 on the screen 302 shown in (3*b*) of FIG. 3A to the center of the icon display area P1 to implement position exchange between the icon 1 and the icon 2, so that the terminal 30 displays the screen 303 shown in (3*c*) of FIG. 3B.

It should be noted that in the icon display control method provided in this embodiment of this disclosure, different drag operation manners for controlling the terminal by the user to move the icon may be supported, thereby simplifying an operation in a process of moving and displaying the icon by the terminal.

In a possible implementation, the icon display control method provided in this embodiment of this disclosure may further include step 204*c* before step 204*b*. The step 204*b* may be replaced with step 204*d*.

Step 204*c*. The terminal receives an input that the user triggers the terminal to display an position-exchanged icon.

For example, for description of "the input of triggering the terminal to display an position-exchanged icon" in this embodiment of this disclosure, reference may be made to related description of the first input, and details are not described herein again.

Optionally, "the input of triggering the terminal to display an position-exchanged icon" may be an operation performed by the user on the "icon editing mode" option in the setup application of the terminal to trigger the terminal to exit the "icon editing mode", so as to display the moved icon. Alternatively, the user may perform an operation on an option with a return function (or an exit function) of the terminal to trigger the terminal to exit the "icon editing mode", so as to display the moved icon but not display the icon control boxes corresponding to the icon display areas.

Step 204*d*. In response to the input of triggering the terminal to display the position-exchanged icon, the terminal cancels the display of the first icon in the icon control box corresponding to the second icon display area.

Specifically, for description of step 204d, reference may be made to the foregoing description of step 204b, and details are not described again in this embodiment of the disclosure.

It should be noted that in the icon display control method provided in this embodiment of this disclosure, after receiving the input that the user triggers the terminal to display the position-exchanged icon, the terminal may exit the "icon editing mode" and display the position-exchanged icon. This can avoid exiting the "icon editing mode" before controlling the terminal by the user to move the icon is completed, so that a position of the icon displayed after the terminal controls the icon to move is a position required by the user.

In a possible implementation, the icon display control method provided in this embodiment of this disclosure may further include step 201a before step 203, and may further include step 205, step 206, and step 207 after step 203.

Step 201a. The terminal displays a third icon in a third icon display area.

The third icon is an icon, other than the first icon and the second icon, displayed on the terminal. For example, with reference to FIG. 3A and FIG. 3B, the third icon may be the icon 3 provided in the foregoing embodiment.

Step 205. The terminal receives a second input by the user.

Specifically, the second input may be an input that the user drags the third icon from the third icon display area to the icon control box corresponding to the second icon display area; or the second input is an input that the user drags the icon control box corresponding to the second icon display area to the third icon display area.

For example, for description of the second input in this embodiment of this disclosure, reference may be made to related description of the first input in the foregoing embodiment, and details are not described again in this embodiment of this disclosure.

Step 206. In response to the second input, the terminal displays the third icon in the icon control box corresponding to the second icon display area, and displays the first icon in the icon control box corresponding to the first icon display area; and The third icon display area is an icon display area in which the third icon is located before the terminal moves the third icon.

For example, with reference to FIG. 3, the third icon display area may be the icon display area P3, and the icon control box corresponding to the third icon display area may be the icon control box C3.

Figure 4A:
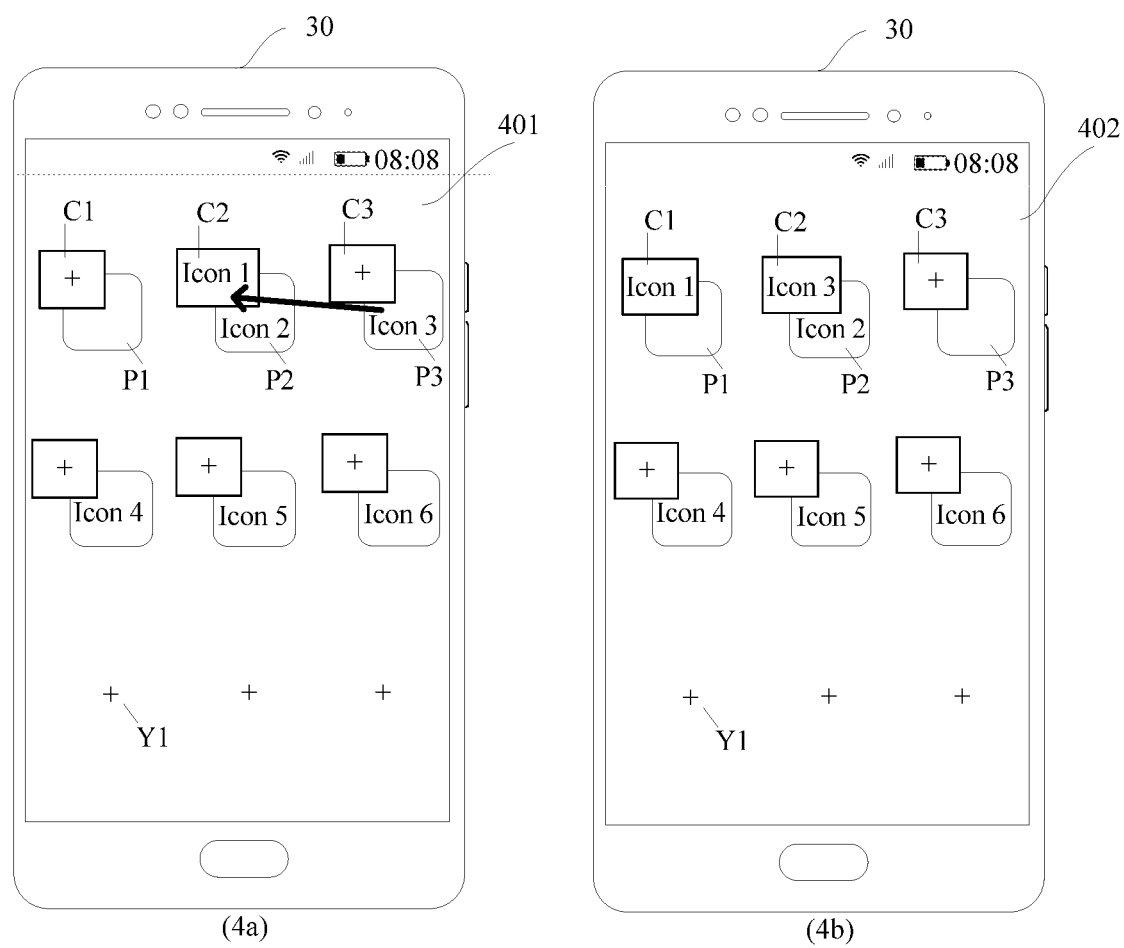
FIG. 4A and FIG. 4B are a schematic diagram 5 of a screen displayed on a terminal according to an embodiment of this disclosure.
Figure 4B:
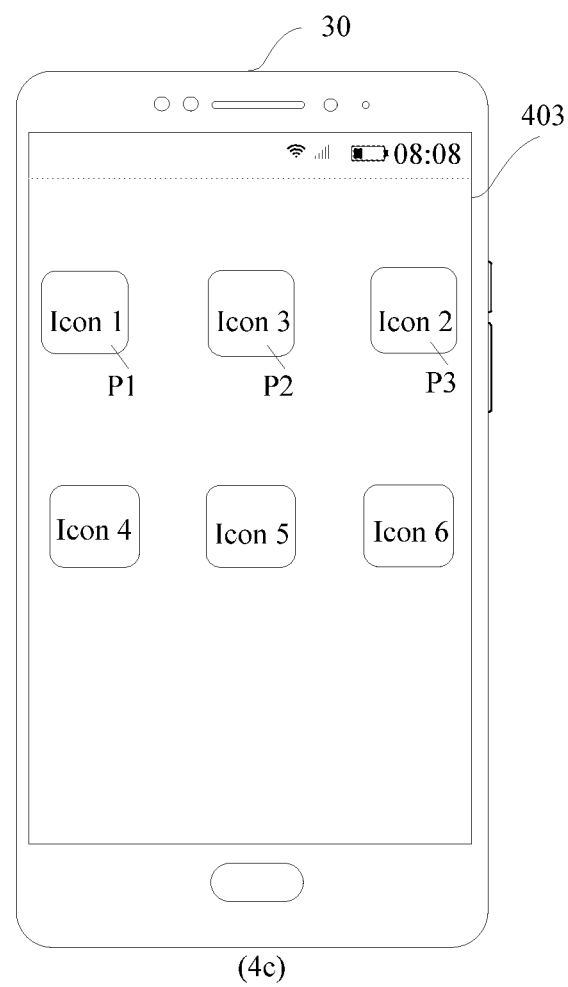

For example, FIG. 4A and FIG. 4B are a schematic diagram of another screen displayed on a terminal according to an embodiment of this disclosure. With reference to FIG. 3-3, after the icon 1 is displayed in the icon control block C2 on the screen 307 displayed on the terminal 30, if the terminal 30 receives an input that the user triggers the terminal to exchange the icon 3 and the icon 2, a process of controlling the icon 3 to move from the icon display area P3 to the icon control block C2 on a screen 401 shown in (4a) of FIG. 4A may be displayed. Then, the terminal 30 may display a screen 402 shown in (4b) of FIG. 4A. On the screen 402, the icon 3 is displayed in the icon control box C2 and the icon 1 is displayed in the icon control box C1.

It can be understood that in the process in which the terminal 30 replaces the icon 1 in the icon control box C2 with the icon 3, the icon 1 may be moved to the icon control box C1 corresponding to the icon display area P1 in which the icon 1 is located before being moved.

Step 207. The terminal updates the display content of the first icon display area to the first icon, updates the display content of the second icon display area to the third icon, and updates display content of the third icon display area to the second icon.

For example, as shown in FIG. 4A and FIG. 4B, after the terminal 30 displays the screen 402 shown in (4b) of FIG. 4A, the terminal 30 may display a screen 403 shown in (4c) of FIG. 4B if the terminal 30 receives the input that the user triggers the terminal 30 to display exchanged icons. On the screen 403, the icon 1 is displayed in the icon display area P1, the icon 2 is displayed in the icon display area P3, and the icon 3 is displayed in icon display area P2. Furthermore, the icon control boxes corresponding to the icon display areas are not displayed on the screen 403.

It can be understood that, in the icon display control method provided in this embodiment of this disclosure, if step 207 is performed, step 204a is not performed. That is, step 204a may be replaced with step 207.

It should be noted that in the icon display control method provided in this embodiment of this disclosure, in a process in which the terminal replaces an icon in an icon control box with another icon, the terminal may move the icon to an icon control box corresponding to an icon display area in which the icon is located before being moved. In this way, for a position of an icon that has been moved and does not need to be moved again in the terminal, the position of the icon does not change in the process of icon moving of the terminal, so that the position of the icon displayed after the terminal controls the icon to move is a position required by the user.

In a possible implementation, the icon display control method provided in this embodiment of this disclosure may further include step 208, step 209, and step 210 after step 206.

Step 208. The terminal receives a third input by the user.

The third input is an input that the user drags the first icon from the icon control box corresponding to the first icon display area to the icon control box corresponding to the third icon display area; or the third input is an input that the user drags the icon control box corresponding to the third icon display area to the icon control box corresponding to the first icon display area.

For example, for description of the third input in this embodiment of this disclosure, reference may be made to related description of the first input in the foregoing embodiment, and details are not described again in this embodiment of this disclosure.

Step 209. In response to the third input, the terminal displays the first icon in the icon control box corresponding to the third icon display area, and cancels the display of the first icon in the icon control box corresponding to the first icon display area.

Figure 5A:
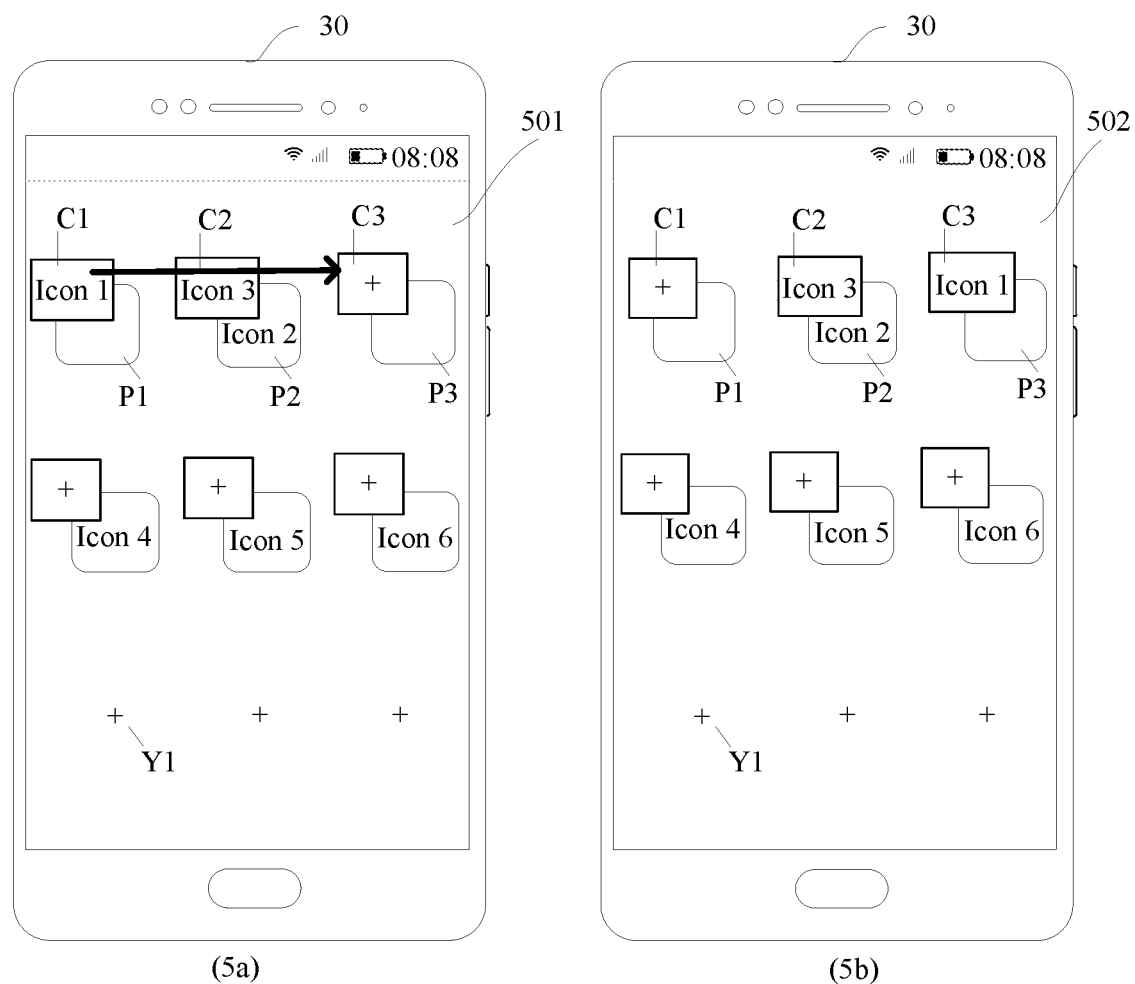
FIG. 5A and FIG. 5B are a schematic diagram 6 of a screen displayed on a terminal according to an embodiment of this disclosure.
Figure 5B:
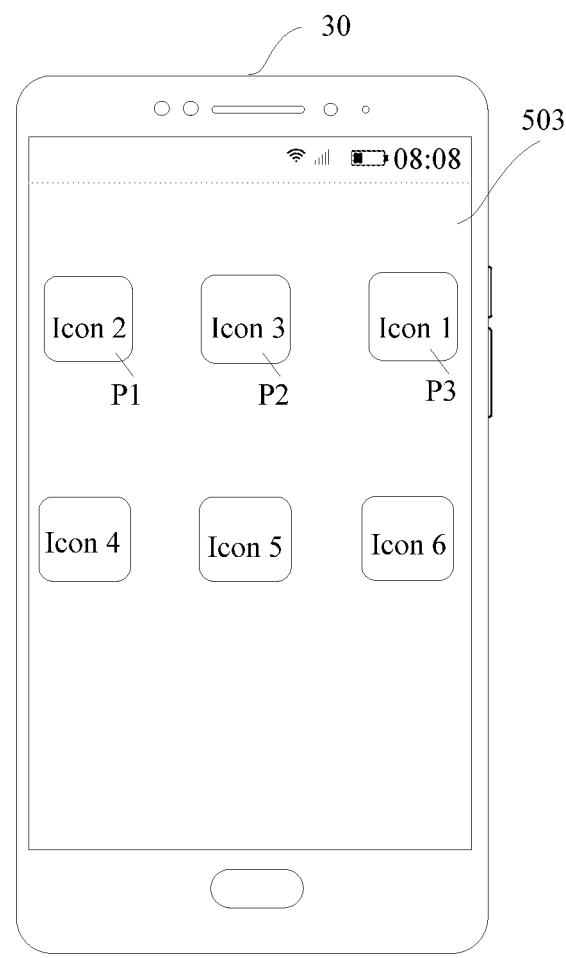

For example, FIG. 5A and FIG. 5B are a schematic diagram of another screen displayed on a terminal according to an embodiment of this disclosure. With reference to (4b) of FIG. 4A, after the screen 402 is displayed on the terminal 30, if the terminal 30 receives an input that the user triggers the terminal 30 to control the icon 1 to move to the icon control box C3, the terminal 30 may display a screen 501 shown in (5a) of FIG. 5A. A process in which the terminal controls the icon 1 to move from the icon control box C1 to the icon control box C3 is shown on the screen 501. Then, the terminal 30 may display the screen 502 shown in (5b) of FIG. 5A. On the screen 502, the icon 1 is displayed in the icon control box C3, and the display of the icon 1 in the icon control box C1 is canceled.

Step 210. The terminal updates the display content of the first icon display area to the second icon, updates the display content of the second icon display area to the third icon, and updates display content of the third icon display area to the first icon.

For example, after the terminal 30 displays the screen 502 shown in (5b) of FIG. 5A, the terminal 30 may display a screen 503 shown in (5c) of FIG. 5B if the terminal 30 receives an input that the user triggers the terminal 30 to display exchanged icons. On the screen 503, the icon 1 is displayed in the icon display area P3, the icon 2 is displayed in the icon display area P1, and the icon 3 is displayed in icon display area P2.

It can be understood that, in the icon display control method provided in this embodiment of this disclosure, if step 210 is performed, step 207 is not performed. That is, step 207 may be replaced with step 210.

It should be noted that in the icon display control method provided in this embodiment of this disclosure, the terminal may move an icon in one icon control box to another icon control box including no icon, so as to move the icon to an icon display area corresponding to the another icon control box. This helps simplify the operation of icon moving and displaying of the terminal.

In a possible implementation, the icon display control method provided in this embodiment of this disclosure may further include step 211, step 212, and step 213 after step 206.

Step 211. The terminal receives a fourth input by the user.

The fourth input is an input that the user drags the second icon from the second icon display area to the icon control box corresponding to the third icon display area; or the fourth input is an input that the user drags the icon control box corresponding to the third icon display area to the second icon display area.

For example, for description of the fourth input in this embodiment of this disclosure, reference may be made to related description of the first input in the foregoing embodiment, and details are not described again in this embodiment of this disclosure.

Step 212. In response to the fourth input, the terminal displays the second icon in the icon control box corresponding to the third icon display area.

Figure 6A:
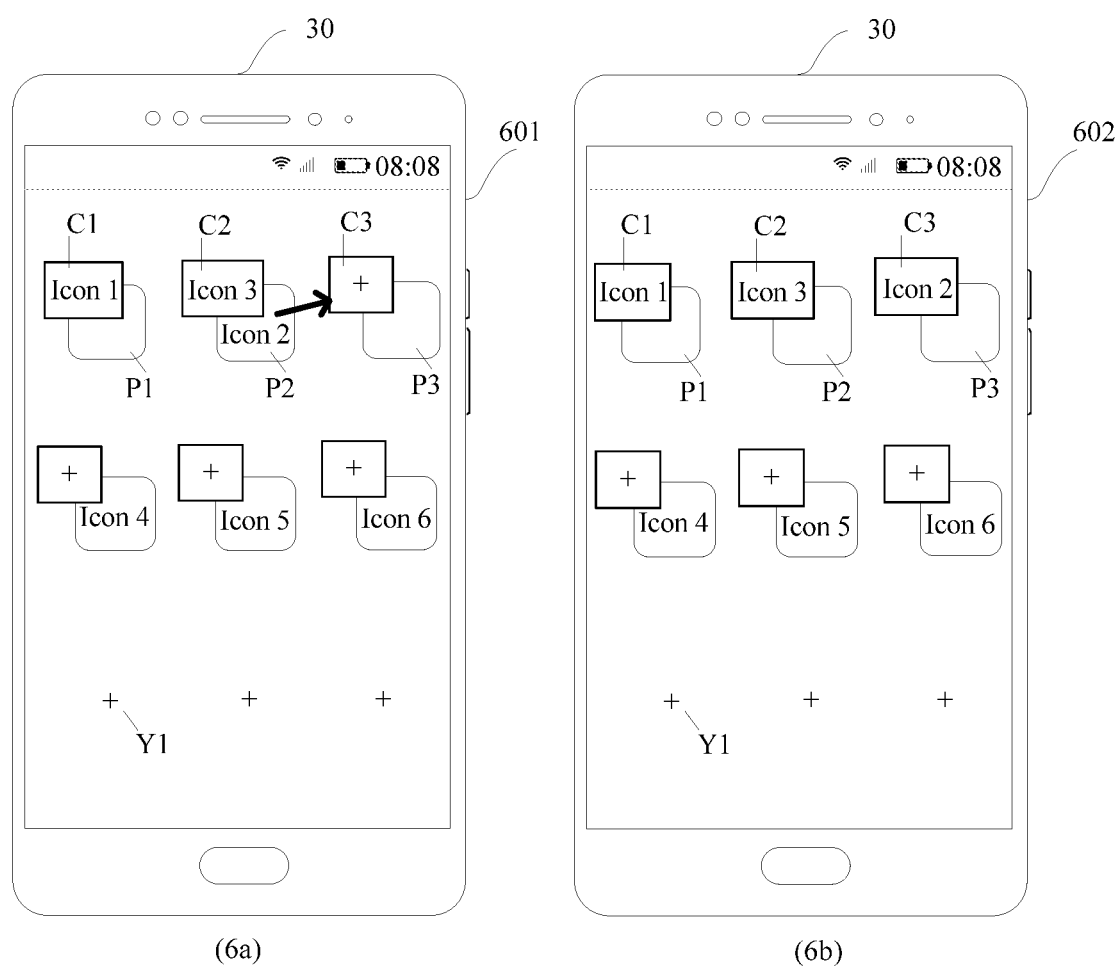
FIG. 6A and FIG. 6B are a schematic diagram 7 of a screen displayed on a terminal according to an embodiment of this disclosure.
Figure 6B:
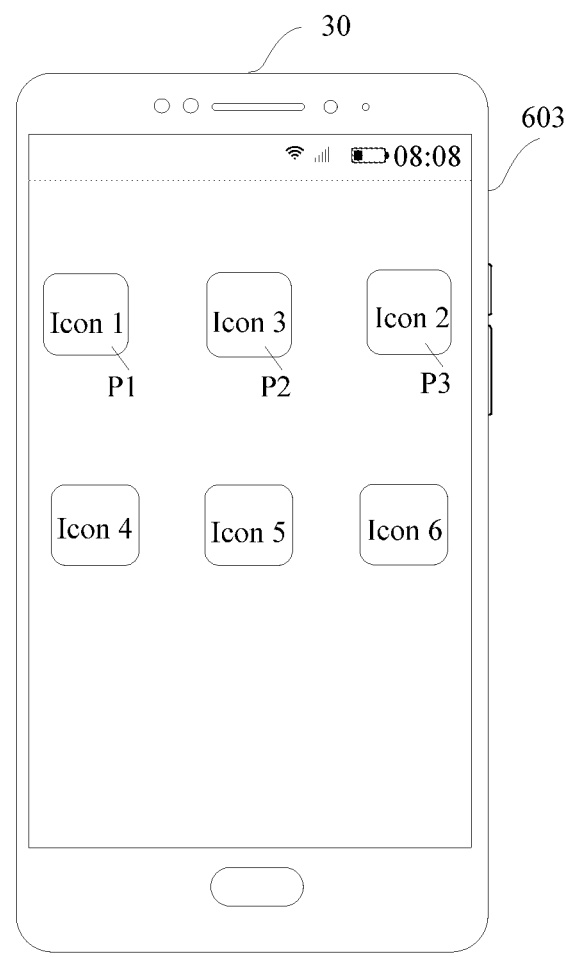

For example, FIG. 6A and FIG. 6B are a schematic diagram of another screen displayed on a terminal according to an embodiment of this disclosure. With reference to (4b) of FIG. 4A, after the screen 402 is displayed on the terminal 30, if the terminal 30 receives an input that the user triggers the terminal 30 to control the icon 2 to move to the icon control box C3, the terminal 30 may display a screen 601 shown in (6a) of FIG. 6A. A process in which the terminal controls the icon 2 to move from the icon display area P2 to the icon control box C3 is shown on the screen 601. Then, the terminal 30 may display a screen 602 shown in (6b) of FIG. 6A. The icon 2 is displayed in the icon control box C3 on the screen 602.

Step 213. The terminal updates the display content of the first icon display area to the first icon, updates the display content of the second icon display area to the third icon, and updates the display content of the third icon display area to the second icon.

For example, after the terminal 30 displays the screen 602 shown in (6b) of FIG. 6A, the terminal 30 may display a screen 603 shown in (6c) of FIG. 6B if the terminal 30 receives an input that the user triggers the terminal 30 to display exchanged icons. On the screen 603, the icon 1 is displayed in the icon display area P1, the icon 2 is displayed in the icon display area P3, and the icon 3 is displayed in icon display area P2.

It can be understood that, in the icon display control method provided in this embodiment of this disclosure, if step 213 is performed, step 207 is not performed. That is, step 207 may be replaced with step 213.

It can be understood that, in the icon display control method provided in this embodiment of this disclosure, in a process of controlling the terminal by the user to move icons, all icons that need to be moved may be moved to icon control boxes corresponding to target icon display areas. In this way, both a position and an order of an unmoved icon do not change in the process of controlling a plurality of icons by the terminal to move.

In a possible implementation, the icon display control method provided in this embodiment of this disclosure may further include step 214, step 215, and step 216 after step 209.

Step 214. The terminal receives a fifth input by the user.

The fifth input is an input that the user drags the first icon from the icon control box corresponding to the third icon display area to the icon control box corresponding to the second icon display area; or the fifth input is an input that the user drags the icon control box corresponding to the second icon display area to the icon control box corresponding to the third icon display area.

For example, for description of the fifth input in this embodiment of this disclosure, reference may be made to related description of the first input in the foregoing embodiment, and details are not described again in this embodiment of this disclosure.

Step 215. In response to the fifth input, the terminal displays the first icon in the icon control box corresponding to the second icon display area, and displays the third icon in the icon control box corresponding to the third icon display area.

Figure 7A:
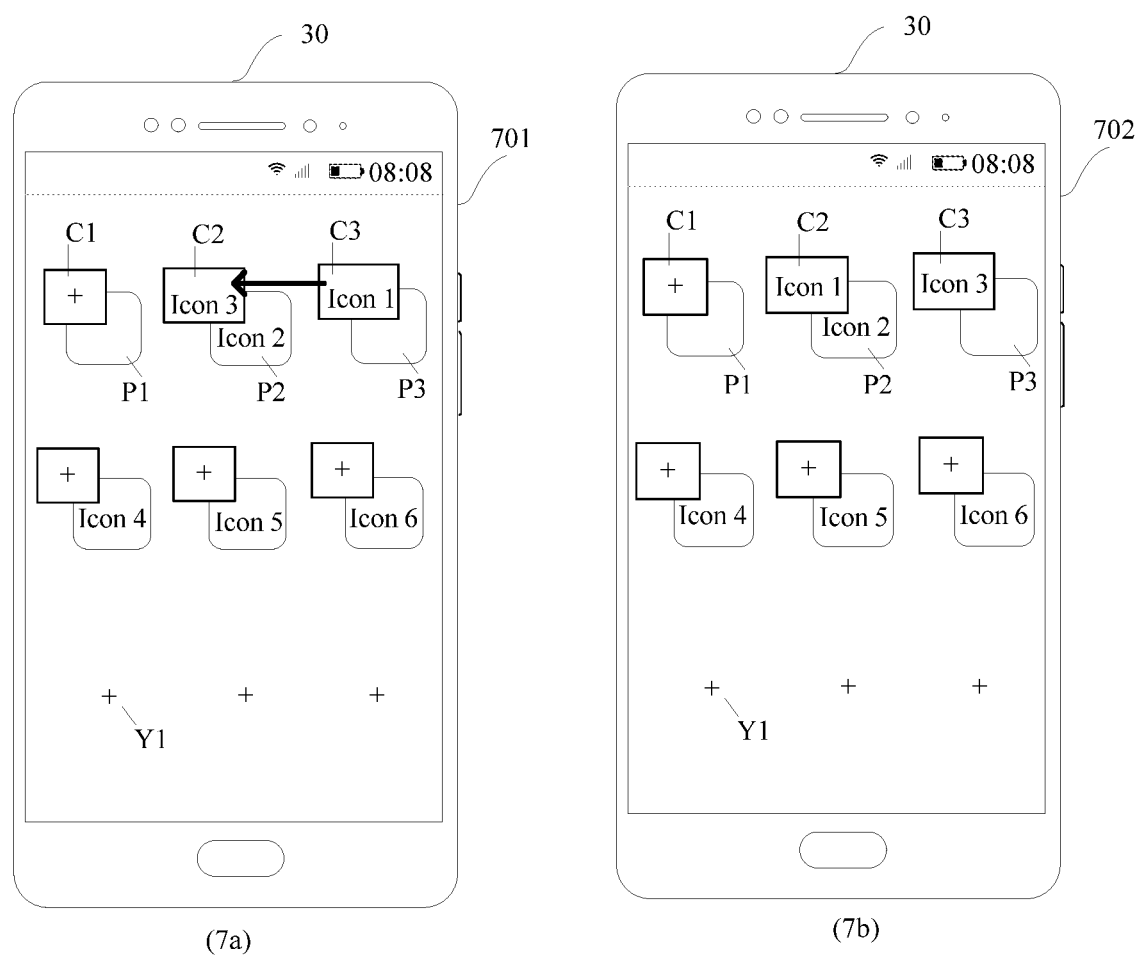
FIG. 7A and FIG. 7B are a schematic diagram 8 of a screen displayed on a terminal according to an embodiment of this disclosure.
Figure 7B:
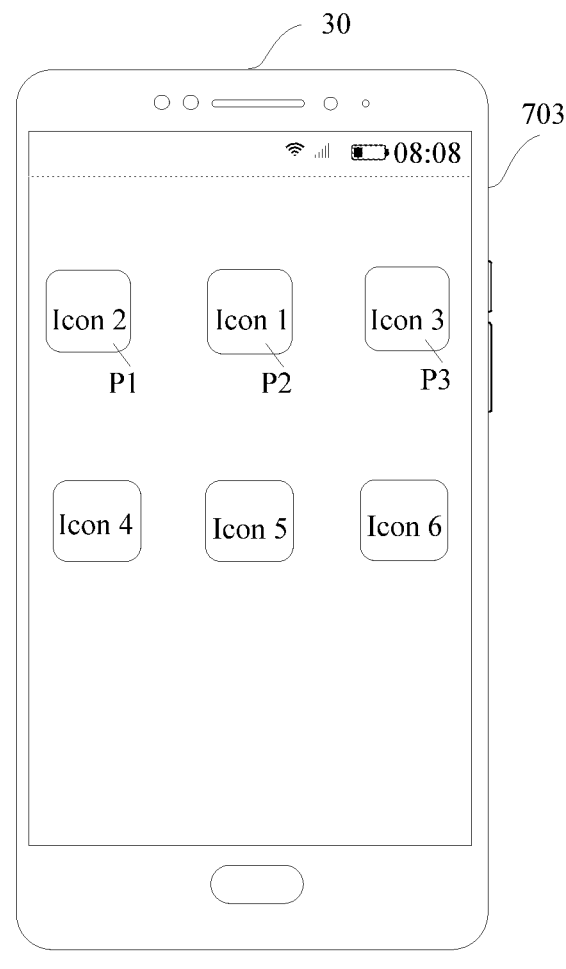

For example, FIG. 7A and FIG. 7B are a schematic diagram of another screen displayed on a terminal according to an embodiment of this disclosure. With reference to (5b) of FIG. 5A, after the screen 502 is displayed on the terminal 30, if the terminal 30 receives an input that the user triggers the terminal 30 to exchanged the icon 1 and the icon 3, the terminal 30 may display a screen 701 shown in (7a) of FIG. 7A. A process in which the terminal controls the icon 1 to move from the icon control box C3 to the icon control box C2 is shown on the screen 701. Then, the terminal 30 may display the screen 702 shown in (7b) of FIG. 7A. On the screen 702, the icon 1 is displayed in the icon control box C2 and the icon 3 is displayed in the icon control box C3.

Step 216. The terminal updates the display content of the first icon display area to the second icon, updates the display content of the second icon display area to the first icon, and updates the display content of the third icon display area to the third icon.

For example, after the terminal 30 displays the screen 702 shown in (7b) of FIG. 7A, the terminal 30 may display a screen 703 shown in (7c) of FIG. 7B if the terminal 30 receives an input that the user triggers the terminal 30 to display exchanged icons. On the screen 703, the icon 1 is displayed in the icon display area P2, the icon 2 is displayed in the icon display area P1, and the icon 3 is displayed in icon display area P3.

It can be understood that, in the icon display control method provided in this embodiment of this disclosure, if step 216 is performed, step 210 is not performed. That is, step 210 may be replaced with step 216.

It should be noted that, in the icon display control method provided in this embodiment of this disclosure, in a process in which the user controls the terminal to move and display icons, the terminal may directly exchange icons in two icon control boxes. This helps simplify the operation of moving icons by the terminal.

In a possible implementation, the icon display control method provided in this embodiment of this disclosure may further include step 217 and step 218 after step 203.

Step 217. The terminal receives a sixth input by the user, where the sixth input is an input performed by the user on a first control in the icon control box corresponding to the second icon display area.

For example, for description of the sixth input in this embodiment of this disclosure, reference may be made to related description of the first input in the foregoing embodiment, and details are not described again in this embodiment of this disclosure.

Step 218. In response to the sixth input, the terminal controls the first icon to move out of the icon control box corresponding to the second icon display area.

Specifically, one icon control box is corresponding to one first control, and the one first control is used to move an icon out of the corresponding icon control box.

Optionally, in a scenario in which one first control is used to move an icon out of one icon control box, the first control may be displayed when an icon is included in the one icon control box.

Similarly, for description of a position of the first control in the one icon control box, reference may be made to related description of displaying one icon control box in one icon display area in the foregoing embodiment, and details are not described in this embodiment of this disclosure.

Figure 8:
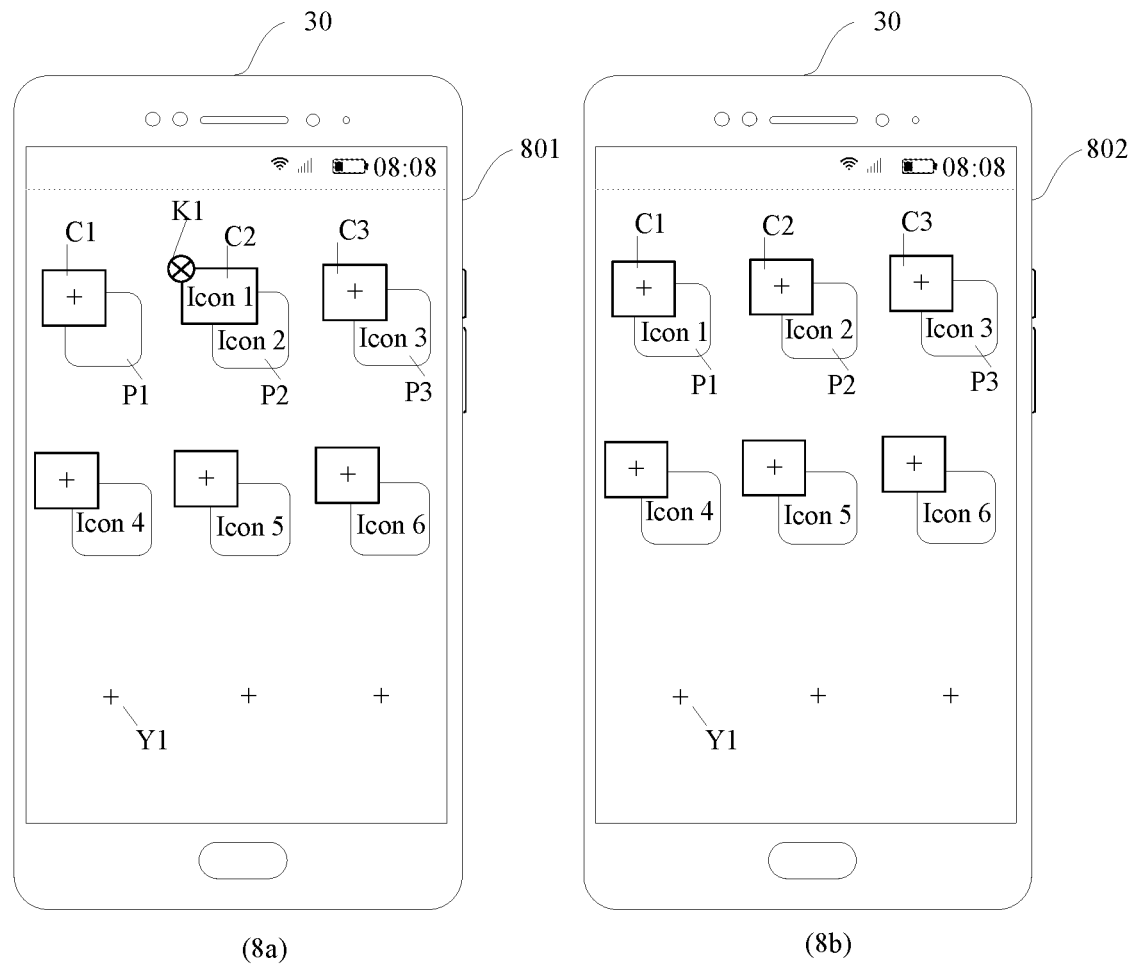
FIG. 8 is a schematic diagram 9 of a screen displayed on a terminal according to an embodiment of this disclosure.

For example, FIG. 8 is a schematic diagram of another screen displayed on a terminal according to an embodiment of this disclosure. Alternatively, after the terminal 30 displays the screen 302 shown in (3b) of FIG. 3A, the terminal may display a screen 801 of the terminal 30 shown in (8a) of FIG. 8. A control K1 is displayed in the upper left corner of the icon control box C2 shown on the screen 801.

Then, after the user performs an input on the control K1 shown in FIG. 8, the terminal 30 may display the screen 802 shown in (8b) of FIG. 8. On the screen 802, the icon 1 is displayed in the icon display area P1. The icon control box C2 shown on the screen 802 does not include the control K1. The control K1 is the first control in the icon control box C2.

Further, when the screen displayed on the terminal includes at least two icon areas, the screen may further include an option that is used by the user to cancel an input. After performing an input on the option, the user may cancel a previous operation of icon moving of the terminal, or cancel all operations of icon moving of the terminal.

It should be noted that, in the icon display control method provided in this embodiment of this disclosure, the terminal may provide the first control that supports the user to operate an icon control box corresponding to an icon display area. This can facilitate an operation performed when the user controls the terminal to move icons, for example, facilitating an operation of controlling the terminal by the user to move an icon out of an icon control box.

In a possible implementation, the icon display control method provided in this embodiment of this disclosure may further include step 219 to step 222 after step 201.

Step 219. The terminal receives a seventh input by the user, where the seventh input is an input performed by the user on a second control in the icon control box corresponding to the second icon display area.

For example, for description of the seventh input in this embodiment of this disclosure, reference may be made to related description of the first input in the foregoing embodiment, and details are not described again in this embodiment of this disclosure.

Step 220: The terminal displays a first list in response to the seventh input, where the first list includes N identifiers that are in one-to-one correspondence with N icons.

The N icons include the first icon, the second icon, and the third icon, where N is a positive integer.

Optionally, an identifier may be a name of a corresponding icon or a smaller form of the corresponding icon.

Step 221. The terminal receives an eighth input by the user, where the eighth input is an input that the user selects a first identifier from the N identifiers.

For example, for description of the eighth input in this embodiment of this disclosure, reference may be made to related description of the first input in the foregoing embodiment, and details are not described again in this embodiment of this disclosure.

Step 222. In response to the eighth input, the terminal displays an icon corresponding to the first identifier in the icon control box corresponding to the second icon display area.

It should be noted that, in the icon display control method provided in this embodiment of this disclosure, the terminal may provide a control that supports the user to operate an icon in an icon control box. This can facilitate an operation performed when the user controls the terminal to move icons, for example, facilitating an operation of controlling the terminal by the user to add an icon to an icon control box.

Figure 9:
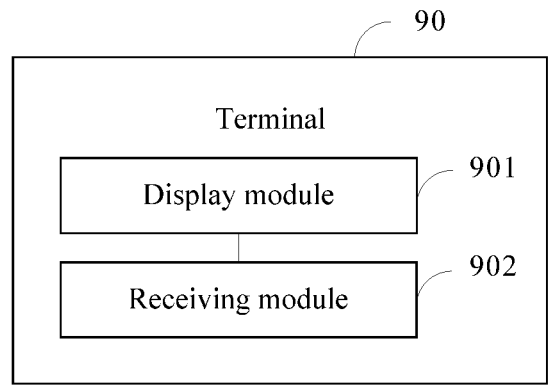
FIG. 9 is a schematic structural diagram of a terminal according to an embodiment of this disclosure.

FIG. 9 is a schematic structural diagram of a terminal according to an embodiment of this disclosure. The terminal shown in FIG. 9 includes a display module 901 and a receiving module 902. The display module 901 is configured to display a first icon and a second icon in a first icon display area and a second icon display area, respectively. The receiving module 902 is configured to receive a first input by a user. The display module 901 is further configured to: in response to the first input received by the receiving module 902, display the first icon in an icon control box corresponding to the second icon display area; and update display content of the second icon display area to the first icon.

Optionally, the display module 901 is specifically configured to update the display content of the second icon display area to the first icon, and update display content of the first icon display area to the second icon.

Optionally, the display module 901 is further configured to cancel the display of the first icon in the icon control box corresponding to the second icon display area.

Optionally, the receiving module 902 is specifically configured to receive the first input that the user drags the first icon from the first icon display area to the icon control box corresponding to the second icon display area; or receive the first input that the user drags the icon control box corresponding to the second icon display area to the first icon display area.

Optionally, the display module 901 is further configured to display a third icon in a third icon display area before displaying the first icon in the icon control box corresponding to the second icon display area. The receiving module 902 is further configured to receive a second input by the user after the display module 901 displays the first icon in the icon control box corresponding to the second icon display area. The display module 901 is further configured to: in response to the second input received by the receiving module 902, display the third icon in the icon control box corresponding to the second icon display area, and display the first icon in an icon control box corresponding to the first icon display area; and update the display content of the first icon display area to the first icon, update the display content of the second icon display area to the third icon, and update the display content of the third icon display area to the second icon. The second input is an input that the user drags the third icon from the third icon display area to the icon control box corresponding to the second icon display area; or the second input is an input that the user drags the icon control box corresponding to the second icon display area to the third icon display area.

Optionally, the receiving module 902 is further configured to receive a third input by the user after the display module 901 displays the third icon in the icon control box corresponding to the second icon display area, and displays the first icon in the icon control box corresponding to the first icon display area. The display module 901 is further configured to: in response to the third input received by the receiving module 902, display the first icon in an icon control box corresponding to the third icon display area, and cancel the display of the first icon in the icon control box corresponding to the first icon display area; and update the display content of the first icon display area to the second icon, update the display content of the second icon display area to the third icon, and update display content of the third icon display area to the first icon. The third input is an input that the user drags the first icon from the icon control box corresponding to the first icon display area to the icon control box corresponding to the third icon display area; or the third input is an input that the user drags the icon control box corresponding to the third icon display area to the icon control box corresponding to the first icon display area.

Optionally, the receiving module 902 is further configured to receive a fourth input by the user after the display module 901 displays the third icon in the icon control box corresponding to the second icon display area, and displays the first icon in the icon control box corresponding to the first icon display area. The display module 901 is further configured to: in response to the fourth input received by the receiving module 902, display the second icon in an icon control box corresponding to the third icon display area; and update the display content of the first icon display area to the first icon, update the display content of the second icon display area to the third icon, and update display content of the third icon display area to the second icon. The fourth input is an input that the user drags the second icon from the second icon display area to the icon control box corresponding to the third icon display area; or the fourth input is an input that the user drags the icon control box corresponding to the third icon display area to the second icon display area.

Optionally, the receiving module 902 is further configured to receive a fifth input by the user after the display module 901 displays the first icon in the icon control box corresponding to the third icon display area, and cancels the display of the first icon in the icon control box corresponding to the first icon display area. The display module 901 is further configured to: in response to the fifth input received by the receiving module 902, display the first icon in the icon control box corresponding to the second icon display area, and display the third icon in the icon control box corresponding to the third icon display area; and update the display content of the first icon display area to the second icon, update the display content of the second icon display area to the first icon, and update the display content of the third icon display area to the third icon. The fifth input is an input that the user drags the first icon from the icon control box corresponding to the third icon display area to the icon control box corresponding to the second icon display area; or the fifth input is an input that the user drags the icon control box corresponding to the second icon display area to the icon control box corresponding to the third icon display area.

Optionally, the receiving module 902 is further configured to receive a sixth input by the user after the display module 901 displays the first icon in the icon control box corresponding to the second icon display area. The sixth input is an input performed by the user on a first control in the icon control box corresponding to the second icon display area. The display module 901 is further configured to: in response to the sixth input received by the receiving module 902, control the first icon to move out of the icon control box corresponding to the second icon display area.

Optionally, the receiving module 902 is further configured to receive a seventh input by the user after the display module 901 displays the first icon and the second icon in the first icon display area and the second icon display area, respectively. The display module 901 is further configured to: in response to the seventh input received by the receiving module 902, display a first list. The first list includes N identifiers corresponding to N icons, the N icons include the first icon and the second icon, and N is a positive integer. The receiving module 902 is further configured to receive an eighth input by the user, where the eighth input is an input that the user selects a first identifier from the N identifiers. The display module 901 is further configured to: in response to the eighth input received by the receiving module 902, display an icon corresponding to the first identifier in the icon control box corresponding to the second icon display area The terminal 90 provided in this embodiment of this disclosure and the foregoing terminal 30 are capable of implementing various processes implemented by the terminal in the method embodiments. To avoid repetition, details are not described herein again.

According to the terminal in this embodiment of this disclosure, in a scenario in which the terminal controls an icon to move and display, when the terminal displays an icon on a current screen, the terminal may also display an icon display area in which the icon is located and an icon control box corresponding to the icon display area. Therefore, when the terminal controls icons to move, an icon may be moved from one icon display area to an icon control box corresponding to another icon display area, so as to change the icon display area in which the icon is located, that is, change a position of the icon. An icon does not need to be moved to a blank area before being moved to another icon display area. In this way, a problem that a process of controlling an icon by the terminal to display is complicated and time-consuming can be resolved. In addition, both a position and an order of an unmoved icon do not change in the process of controlling an icon by the terminal to move and display.

Figure 10:
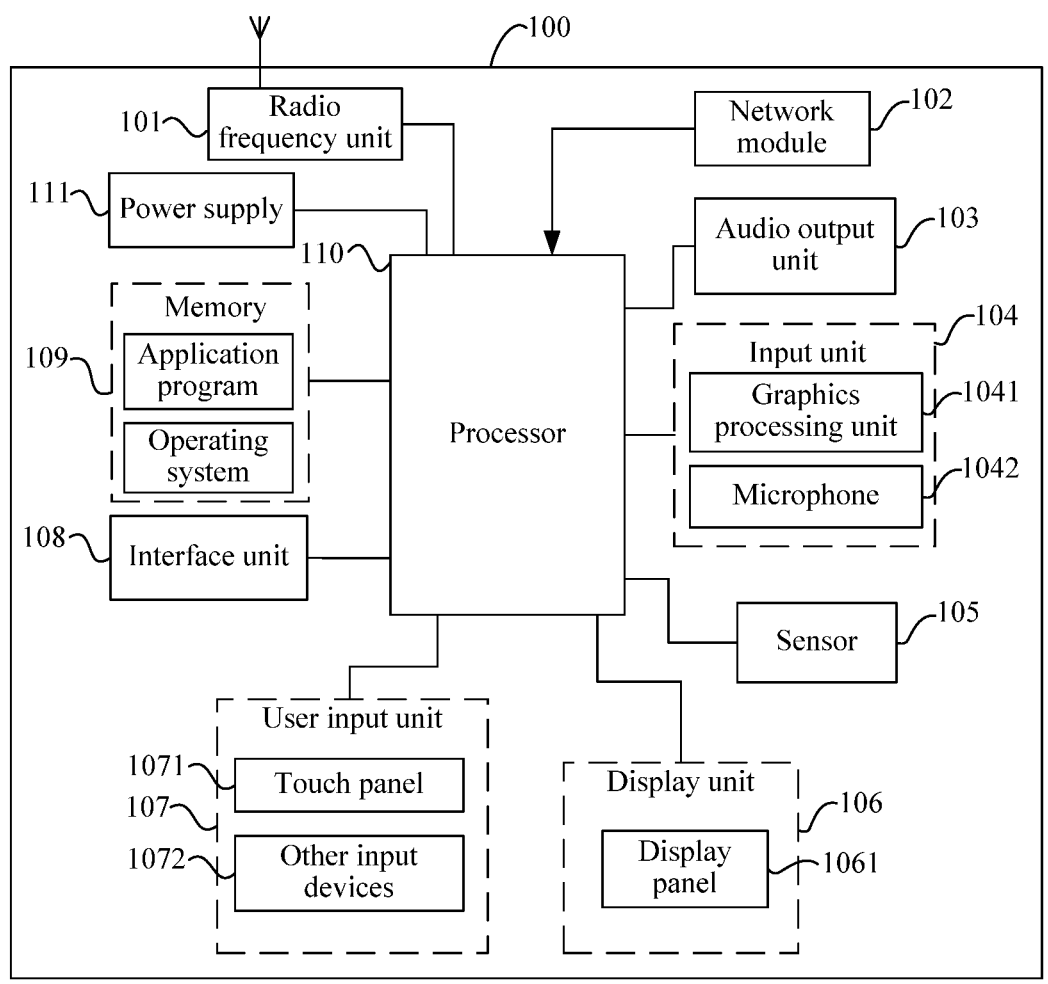
FIG. 10 is a schematic diagram of a hardware structure of a terminal according to an embodiment of this disclosure.

FIG. 10 is a schematic diagram of a hardware structure of a terminal according to an embodiment of this disclosure. The terminal 100 shown in FIG. 10 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. Persons skilled in the art can understand that the structure of the terminal shown in FIG. 10 does not constitute any limitation on the terminal. The terminal may include more or fewer components than those shown in the diagram, or some components may be combined, or the components may be disposed in different manners. In this embodiment of this disclosure, the terminal includes but is not limited to a mobile phone, a tablet computer, a laptop computer, a personal digital assistant, an in-vehicle terminal, a wearable device, a pedometer, and the like.

The display unit 106 is configured to display a first icon and a second icon in a first icon display area and a second icon display area, respectively. The user input unit 107 is configured to receive a first input by a user. The display unit 106 is further configured to: in response to the first input received by the user input unit 107, display the first icon in an icon control box corresponding to the second icon display area, and update display content of the second icon display area to the first icon.

According to the terminal in this embodiment of this disclosure, in a scenario in which the terminal controls an icon to move and display, when the terminal displays an icon on a current screen, the terminal may also display an icon display area in which the icon is located and an icon control box corresponding to the icon display area. Therefore, when the terminal controls icons to move, an icon may be moved from one icon display area to an icon control box corresponding to another icon display area, so as to change the icon display area in which the icon is located, that is, change a position of the icon. An icon does not need to be moved to a blank area before being moved to another icon display area. In this way, a problem that a process of controlling an icon by the terminal to display is complicated and time-consuming can be resolved. In addition, both a position and an order of an unmoved icon do not change in the process of controlling an icon by the terminal to move and display.

It should be understood that in this embodiment of this disclosure, the radio frequency unit 101 may be configured to send or receive a signal in an information sending/receiving or call process. Specially, after receiving downlink data from a base station, the radio frequency unit 101 sends the downlink data to the processor 110 for processing, and sends uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may also communicate with a network and another device through a wireless communications system.

The terminal provides the user with wireless broadband Internet access by using the network module 102, for example, helping the user to send and receive e-mails, browse web pages, and access streaming media.

The audio output unit 103 may convert audio data received by the radio frequency unit 101 or the network module 102 or stored in the memory 109 into an audio signal and output a sound. In addition, the audio output unit 103 may also provide an audio output (for example, a call signal reception sound or a message reception sound) related to a specific function performed by the terminal 100. The audio output unit 103 includes a speaker, a buzzer, a receiver, or the like.

The input unit 104 is configured to receive an audio or video signal. The input unit 104 may include a graphics processing unit (GPU) 1041 and a microphone 1042. The graphics processing unit 1041 processes image data of a still picture or video obtained by an image capture apparatus (such as a camera) in a video capture mode or an image capture mode. A processed image frame may be displayed on the display unit 106. The image frame processed by the graphics processing unit 1041 may be stored in the memory 109 (or another storage medium) or sent by using the radio frequency unit 101 or the network module 102. The microphone 1042 is capable of receiving sounds and processing such sounds into audio data. The processed audio data can be converted into a format output that can be sent to a mobile communication base station through the radio frequency unit 101 in a telephone call mode.

The terminal 100 may further include at least one sensor 105, for example, a light sensor, a motion sensor, or another sensor. Specifically, the light sensor may include an ambient light sensor and a proximity sensor. The ambient light sensor may adjust luminance of the display panel 1061 based on brightness of ambient light, and the proximity sensor may turn off the display panel 1061 and/or backlight when the terminal 100 moves close to an ear. As a motion sensor, an accelerometer sensor may detect a magnitude of acceleration in each direction (generally three axes), and in a stationary state, may detect the magnitude and direction of gravity, and may be used to recognize terminal postures (for example, shift between a landscape orientation and a portrait orientation, related games, and magnetometer posture calibration), and vibration recognition-related functions (such as a pedometer and knocking), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by the user or information provided to the user. The display unit 106 may include a display panel 1061, and the display panel 1061 may be configured in a form of a liquid crystal display (Liquid Crystal Display, LCD), an organic light-emitting diode (Organic Light-Emitting Diode, OLED), or the like.

The user input unit 107 may be configured to: receive a digit or character information that is input, and generate a signal input related to user settings and function control of the terminal. Specifically, the user input unit 107 may include a touch panel 1071 and other input devices 1072. The touch panel 1071 is also referred to as a touchscreen and may collect a touch operation (such as an operation performed by the user on the touch panel 1071 or near the touch panel 1071 with a finger or by using any proper object or accessory such as a stylus) of the user on or near the touch panel. Optionally, the touch panel 1071 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 110, and can receive a command sent by the processor 110 and execute the command In addition, the touch panel 1071 may be implemented in multiple types, such as a resistive type, a capacitive type, an infrared type, and a surface acoustic wave type. In addition to the touch panel 1071, the user input unit 107 may further include the other input devices 1072. Specifically, the other input devices 1072 may include but are not limited to a physical keyboard, a function key (such as a volume control key or a switch key), a trackball, a mouse, and a joystick. Details are not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides a corresponding visual output on the display panel 1061 based on the type of the touch event. In FIG. 10, the touch panel 1071 and the display panel 1061 serve as two independent components to implement input and output functions of the terminal. In some embodiments, however, the touch panel 1071 may be integrated with the display panel 1061 to implement the input and output functions of the terminal. Details are not limited herein.

The interface unit 108 is an interface between an external apparatus and the terminal 100. For example, the external apparatus may include a wired or wireless headset port, an external power (or a battery charger) port, a wired or wireless data port, a memory card port, a port for connecting an apparatus with an identification module, an audio input/output (I/O) port, a video I/O port, an earphone port, and the like. The interface unit 108 may be configured to receive an input (for example, data information or power) from the external apparatus and transmit the received input to one or more elements within the terminal 100, or may be configured to transmit data between the terminal 100 and the external apparatus.

The memory 109 may be configured to store software programs and various data. The memory 109 may primarily include a program storage area and a data storage area. The program storage area may store an operating system, applications (such as an audio play function and an image play function) required by at least one function. The data storage area may store data (such as audio data and phone book) created based on usage of the mobile phone. In addition, the memory 109 may include a high-speed random access memory, and may further include a non-volatile memory such as a disk storage device, a flash memory device, or another volatile solid-state storage device.

The processor 110 is a control center of the terminal, uses various interfaces and lines to connect parts of the entire terminal, and executes various functions and processing data of the terminal by running or executing software programs and/or modules stored in the memory 109 and invoking data stored in the memory 109, so as to perform overall monitoring on the terminal. The processor 110 may include one or more processing units. Preferably, an application processor and a modem processor may be integrated in the processor 110. The application processor primarily processes an operating system, user interfaces, application programs, and the like. The modem processor primarily processes wireless communication. It can be understood that the modem processor may alternatively be not integrated in the processor 110.

The terminal 100 may further include a power supply 111 (such as a battery) that supplies power to components. Preferably, the power supply 111 may be logically connected to the processor 110 through a power management system, thereby implementing functions such as charge management, discharge management, and power consumption management through the power management system.

In addition, the terminal 100 includes some functional modules that are not shown. Details are not described herein.

Preferably, an embodiment of this disclosure further provides a terminal, including a processor 110, a memory 109, and a computer program stored in the memory 109 and capable of running on the processor 110. When the computer program is executed by the processor 110, processes of the foregoing embodiments can be implemented and a same technical effect can be achieved. To avoid repetition, details are not described herein again.

An embodiment of this disclosure further provides a computer readable storage medium, where a computer program is stored in the computer readable storage medium. When being executed by a processor, the computer program implements processes of the foregoing embodiments, and a same technical effect can be achieved. To avoid repetition, details are not described herein again. The computer readable storage medium is, for example, a read-only memory (Read-Only Memory, ROM), a random access memory (Random Access Memory, RAM), a magnetic disk, or an optical disc.

It should be noted that, in this specification, the term "include", "comprise", or any of their variants is intended to cover non-exclusive inclusion, so that processes, methods, articles, or apparatuses including a set of elements include not only those elements but also other elements that are not expressly listed, or further includes elements inherent to such process, method, article, or apparatus. In absence of more constraints, an element preceded by the statement "includes a . . . " does not preclude the existence of other identical elements in the process, method, article, or apparatus that includes the element.

According to the foregoing description of the embodiments, a person skilled in the art can clearly understand that the methods in the foregoing embodiments may be implemented by using software in combination with a necessary common hardware platform, and certainly may alternatively be implemented by using hardware. However, in most cases, the former is a preferred embodiment. Based on such an understanding, the technical solutions of this disclosure essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementations. The foregoing specific implementations are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. An icon display control method, comprising:
    displaying a first icon and a second icon in a first icon display area and a second icon display area, respectively;
    displaying a first icon control box and a second icon control box corresponding to the first icon display area and the second icon display area, respectively, prior to receiving a first input by a user; wherein each of the first icon control box and the second icon control box is used to place one icon to be displayed in each of the corresponding first icon display area and the second icon display area;
    receiving the first input by the user;
    in response to the first input, displaying the first icon in the second icon control box; and
    in the case that the first icon is displayed in the second icon control box, updating display content of the second icon display area to the first icon.

2. The method according to claim 1, wherein the updating display content of the second icon display area to the first icon comprises:
   updating the display content of the second icon display area to the first icon, and updating display content of the first icon display area to the second icon.

3. The method according to claim 2, wherein before the displaying the first icon in the second icon control box, the method further comprises:
   displaying a third icon in a third icon display area;
   displaying a third icon control box corresponding to the third icon display area; and
   after the displaying the first icon in the second icon control box, the method further comprises:
   receiving a second input by the user;
   in response to the second input, displaying the third icon in the second icon control box, and displaying the first icon in the first icon control box; and
   updating the display content of the first icon display area to the first icon, updating the display content of the second icon display area to the third icon, and updating display content of the third icon display area to the second icon; wherein
   the second input is an input that the user drags the third icon from the third icon display area to the second icon control box; or the second input is an input that the user drags the second icon control box to the third icon display area.

4. The method according to claim 3, wherein after the displaying the third icon in the second icon control box, and displaying the first icon in the first icon control box, the method further comprises:
   receiving a third input by the user;
   in response to the third input, displaying the first icon in the third icon control box, and canceling the display of the first icon in the first icon control box; and
   updating the display content of the first icon display area to the second icon, updating the display content of the second icon display area to the third icon, and updating display content of the third icon display area to the first icon; wherein
   the third input is an input that the user drags the first icon from the first icon control box to the third icon control box; or the third input is an input that the user drags the third icon control box to the first icon control box.

5. The method according to claim 4, wherein after the displaying the first icon in the third icon control box, and canceling the display of the first icon in the first icon control box, the method further comprises:
   receiving a fifth input by the user;
   in response to the fifth input, displaying the first icon in the second icon control box, and displaying the third icon in the third icon control box; and
   updating the display content of the first icon display area to the second icon, updating the display content of the second icon display area to the first icon, and updating the display content of the third icon display area to the third icon; wherein
   the fifth input is an input that the user drags the first icon from the third icon control box to the second icon control box; or the fifth input is an input that the user drags the second icon control box to the third icon control box.

6. The method according to claim 3, wherein after the displaying the third icon in the second icon control box, and displaying the first icon in the first icon control box, and before the updating the display content of the first icon display area to the first icon, updating the display content of the second icon display area to the third icon, and updating display content of the third icon display area to the second icon, the method further comprises:
   receiving a fourth input by the user; and
   in response to the fourth input, displaying the second icon in the third icon control box;
   wherein
   the fourth input is an input that the user drags the second icon from the second icon display area to the third icon control box; or the fourth input is an input that the user drags the third icon control box to the second icon display area.

7. The method according to claim 1, wherein the method further comprises:
   canceling the display of the first icon in the second icon control box.

8. The method according to claim 7, wherein the receiving the first input by the user comprises:
   receiving the first input that the user drags the first icon from the first icon display area to the second icon control box; or
   receiving the first input that the user drags the second icon control box to the first icon display area.

9. The method according to claim 1, wherein after the displaying the first icon in the second icon control box, the method further comprises:
   receiving a sixth input by the user, wherein the sixth input is an input performed by the user on a first control in the second icon control box; and
   in response to the sixth input, controlling the first icon to move out of the second icon control box.

10. The method according to claim 1, after the displaying the first icon and the second icon in the first icon display area and the second icon display area, respectively, further comprising:
    receiving a seventh input by the user, wherein the seventh input is an input performed by the user on a second control in the second icon control box;
    in response to the seventh input, displaying a first list, wherein the first list comprises N identifiers corresponding to N icons, the N icons comprises the first icon and the second icon, and N is a positive integer;
    receiving an eighth input by the user, wherein the eighth input is an input that the user selects a first identifier from the N identifiers; and
    in response to the eighth input, displaying an icon corresponding to the first identifier in the second icon control box.

11. A terminal comprising a processor, a memory, and a computer program stored in the memory and capable of running on the processor, wherein the computer program is executed by the processor to implement an icon display control method, comprising:
    displaying a first icon and a second icon in a first icon display area and a second icon display area, respectively;
    displaying a first icon control box and a second icon control box corresponding to the first icon display area and the second icon display area, respectively, prior to receiving a first input by a user; wherein each of the first icon control box and the second icon control box is used to place one icon to be displayed in each of the corresponding first icon display area and the second icon display area;
    receiving the first input by the user;

in response to the first input, displaying the first icon in the second icon control box; and in the case that the first icon is displayed in the second icon control box, updating display content of the second icon display area to the first icon.

12. The terminal according to claim 11, wherein the updating display content of the second icon display area to the first icon comprises:

updating the display content of the second icon display area to the first icon, and updating display content of the first icon display area to the second icon; and/or wherein the method further comprises:

canceling the display of the first icon in the second icon control box.

13. The terminal according to claim 12, wherein the receiving the first input by the user comprises:

receiving the first input that the user drags the first icon from the first icon display area to the second icon control box; or receiving the first input that the user drags the second icon control box to the first icon display area.

14. The terminal according to claim 12, wherein before the displaying the first icon in the second icon control box, the method further comprises:

displaying a third icon in a third icon display area;

displaying a third icon control box corresponding to the third icon display area; and after the displaying the first icon in the second icon control box, the method further comprises:

receiving a second input by the user;

in response to the second input, displaying the third icon in the second icon control box, and displaying the first icon in the first icon control box; and updating the display content of the first icon display area to the first icon, updating the display content of the second icon display area to the third icon, and updating display content of the third icon display area to the second icon; wherein the second input is an input that the user drags the third icon from the third icon display area to the second icon control box; or the second input is an input that the user drags the second icon control box to the third icon display area.

15. The terminal according to claim 14, wherein after the displaying the third icon in the second icon control box, and displaying the first icon in the first icon control box, the method further comprises:

receiving a third input by the user;

in response to the third input, displaying the first icon in the third icon control box, and canceling the display of the first icon in the first icon control box; and updating the display content of the first icon display area to the second icon, updating the display content of the second icon display area to the third icon, and updating display content of the third icon display area to the first icon; wherein the third input is an input that the user drags the first icon from the first icon control box to the third icon control box; or the third input is an input that the user drags the third icon control box to the first icon control box.

16. The terminal according to claim 15, wherein after the displaying the first icon in the third icon control box, and canceling the display of the first icon in the first icon control box, the method further comprises:

receiving a fifth input by the user;

in response to the fifth input, displaying the first icon in the second icon control box, and displaying the third icon in the third icon control box; and updating the display content of the first icon display area to the second icon, updating the display content of the second icon display area to the first icon, and updating the display content of the third icon display area to the third icon; wherein the fifth input is an input that the user drags the first icon from the third icon control box to the second icon control box; or the fifth input is an input that the user drags the second icon control box to the third icon control box.

17. The terminal according to claim 14, wherein after the displaying the third icon in the second icon control box, and displaying the first icon in the first icon control box, and before the updating the display content of the first icon display area to the first icon, updating the display content of the second icon display area to the third icon, and updating display content of the third icon display area to the second icon, the method further comprises:

receiving a fourth input by the user; and in response to the fourth input, displaying the second icon in the third icon control box;

wherein the fourth input is an input that the user drags the second icon from the second icon display area to the third icon control box; or the fourth input is an input that the user drags the third icon control box to the second icon display area.

18. The terminal according to claim 11, wherein after the displaying the first icon in the second icon control box, the method further comprises:

receiving a sixth input by the user, wherein the sixth input is an input performed by the user on a first control in the second icon control box; and in response to the sixth input, controlling the first icon to move out of the second icon control box.

19. The terminal according to claim 11, after the displaying the first icon and the second icon in the first icon display area and the second icon display area, respectively, further comprising:

receiving a seventh input by the user, wherein the seventh input is an input performed by the user on a second control in the second icon control box;

in response to the seventh input, displaying a first list, wherein the first list comprises N identifiers corresponding to N icons, the N icons comprises the first icon and the second icon, and N is a positive integer;

receiving an eighth input by the user, wherein the eighth input is an input that the user selects a first identifier from the N identifiers; and in response to the eighth input, displaying an icon corresponding to the first identifier in the second icon control box.

20. A non-transitory computer readable storage medium storing a computer program, wherein the computer program is executed by a processor to implement an icon display control method, comprising:

displaying a first icon and a second icon in a first icon display area and a second icon display area, respectively;

displaying a first icon control box and a second icon control box corresponding to the first icon display area and the second icon display area, respectively, prior to receiving a first input by a user; wherein each of the first icon control box and the second icon control box is used to place one icon to be displayed in each of the corresponding first icon display area and the second icon display area;

receiving the first input by the user;

in response to the first input, displaying the first icon in the second icon control box; and in the case that the first icon is displayed in the second icon control box, updating display content of the second icon display area to the first icon.

* * * * *